(12) United States Patent
Mehus et al.

(10) Patent No.: US 7,896,198 B2
(45) Date of Patent: *Mar. 1, 2011

(54) METHOD AND APPARATUS FOR MASS BASED DISPENSING

(75) Inventors: Richard J. Mehus, Richfield, MN (US); Thomas J. Batcher, Saint Paul, MN (US); Henry J. McCarrick, Valley Center, CA (US)

(73) Assignee: Ecolab Inc., St. Paul, MN (US)

( * ) Notice: Subject to any disclaimer, the term of this patent is extended or adjusted under 35 U.S.C. 154(b) by 490 days.

This patent is subject to a terminal disclaimer.

(21) Appl. No.: 10/843,230

(22) Filed: May 11, 2004

(65) Prior Publication Data

US 2005/0072793 A1 Apr. 7, 2005

Related U.S. Application Data

(63) Continuation-in-part of application No. 10/437,257, filed on May 12, 2003, now Pat. No. 7,201,290.

(51) Int. Cl.
*G01G 13/00* (2006.01)
*G01G 17/04* (2006.01)
*B01D 11/04* (2006.01)
*B01D 11/02* (2006.01)
*B01D 12/00* (2006.01)
*B01D 15/00* (2006.01)

(52) U.S. Cl. .......................... 222/77; 422/255; 422/261

(58) Field of Classification Search .................. 177/244, 177/16; 222/165, 181.3, 77
See application file for complete search history.

(56) References Cited

U.S. PATENT DOCUMENTS

| 1,985,615 | A | 12/1934 | Mitchell |
| 2,219,597 | A | 10/1940 | Lutz |
| 2,254,269 | A | 9/1941 | Clark et al. |
| 2,319,739 | A | 5/1943 | Kessler |
| 2,333,791 | A | 11/1943 | Hutchinson, Jr. |
| 2,594,975 | A | 4/1952 | Mytling |
| 2,678,374 | A | 5/1954 | Mylting |

(Continued)

FOREIGN PATENT DOCUMENTS

DE  3933763 A1  4/1991

(Continued)

OTHER PUBLICATIONS

Presentation, "ECOLAB Aramark Uniform Services Joining Forces for Service Excellence".

(Continued)

*Primary Examiner*—Sean Conley
*Assistant Examiner*—Regina Yoo
(74) *Attorney, Agent, or Firm*—Shumaker & Sieffert, P.A.

(57) ABSTRACT

A dispenser (200) dispenses an amount of concentrate using a diluent to form a use solution. The dispenser (200) includes a housing (201) having a cavity. A product holder (210) is positioned to support the concentrate in the cavity of the housing (201). A load cell housing (207) is operatively supported by the housing. More than one load cell (240) is positioned in the load cell housing (207). The product holder (210) is supported on the more than one load cell (240), wherein weight of the concentrate is determined.

10 Claims, 20 Drawing Sheets

U.S. PATENT DOCUMENTS

| | | |
|---|---|---|
| 2,714,472 A | 8/1955 | Richardson |
| 2,990,707 A | 7/1961 | Gerhardt et al. |
| 33,861 A | 12/1961 | Whitney |
| 3,091,327 A | 5/1963 | Galley |
| 3,136,157 A * | 6/1964 | Seed et al. ............. 73/862.622 |
| 3,197,980 A | 8/1965 | Marple |
| 3,412,254 A | 11/1968 | Meyer-Doering et al. |
| 3,447,906 A | 6/1969 | Zimmerli |
| 3,526,334 A | 9/1970 | Ashton et al. |
| 3,656,478 A | 4/1972 | Swersey |
| 3,743,598 A | 7/1973 | Field |
| 3,754,871 A | 8/1973 | Hessel et al. |
| 3,760,166 A | 9/1973 | Adams et al. |
| 3,772,193 A | 11/1973 | Nelli et al. |
| 3,774,056 A | 11/1973 | Sample et al. |
| 3,826,113 A | 7/1974 | Noraas et al. |
| 3,826,408 A | 7/1974 | Berndt et al. |
| 3,828,869 A | 8/1974 | Sellers |
| 3,834,587 A | 9/1974 | Bengt et al. |
| 4,040,515 A | 8/1977 | Hessel et al. |
| 4,046,996 A | 9/1977 | Williams et al. |
| 4,076,146 A | 2/1978 | Lausberg et al. |
| 4,195,500 A | 4/1980 | Tobita et al. |
| 4,199,001 A | 4/1980 | Kratz |
| 4,211,517 A | 7/1980 | Schmid |
| 4,222,496 A | 9/1980 | Start et al. |
| 4,241,400 A | 12/1980 | Kiefer |
| 4,247,396 A | 1/1981 | Buesing |
| 4,265,266 A | 5/1981 | Kierbow et al. |
| 4,307,787 A | 12/1981 | Raboud et al. |
| 4,320,855 A | 3/1982 | Ricciardi et al. |
| 4,334,784 A | 6/1982 | Engels |
| 4,353,482 A | 10/1982 | Tomlinson et al. |
| 4,373,418 A | 2/1983 | Rhodes et al. |
| 4,396,828 A | 8/1983 | Dino et al. |
| 4,402,426 A | 9/1983 | Faulkner et al. |
| 4,404,639 A | 9/1983 | McGuire et al. |
| 4,433,917 A | 2/1984 | Mendel et al. |
| 4,463,844 A | 8/1984 | Huffman et al. |
| 4,482,785 A | 11/1984 | Finnegan et al. |
| 4,486,910 A | 12/1984 | Saalmann et al. |
| 4,509,543 A | 4/1985 | Livingston et al. |
| 4,513,796 A | 4/1985 | Miller et al. |
| 4,526,215 A | 7/1985 | Harrison et al. |
| 4,573,606 A | 3/1986 | Lewis et al. |
| RE32,101 E | 4/1986 | Ricciardi et al. |
| RE32,102 E | 4/1986 | Ricciardi et al. |
| 4,597,091 A | 6/1986 | Blake |
| 4,630,654 A | 12/1986 | Kennedy, Jr. |
| 4,632,198 A | 12/1986 | Uchimura |
| 4,660,667 A | 4/1987 | Uchimura et al. |
| 4,676,399 A | 6/1987 | Burckhardt |
| 4,690,230 A | 9/1987 | Uchimura et al. |
| 4,690,305 A | 9/1987 | Copeland |
| 4,697,243 A | 9/1987 | Moore et al. |
| 4,707,848 A | 11/1987 | Durston et al. |
| 4,711,370 A | 12/1987 | Goudy, Jr. et al. |
| 4,733,971 A | 3/1988 | Pratt |
| 4,756,321 A | 7/1988 | Livingston et al. |
| 4,766,548 A | 8/1988 | Cedrone et al. |
| 4,770,859 A | 9/1988 | Heiser, Jr. |
| 4,789,014 A | 12/1988 | DiGianfilippo et al. |
| 4,826,661 A | 5/1989 | Copeland et al. |
| 4,830,508 A | 5/1989 | Higuchi et al. |
| 4,834,546 A | 5/1989 | Pütz |
| 4,836,685 A | 6/1989 | Verreault |
| 4,837,811 A | 6/1989 | Butler et al. |
| 4,845,965 A | 7/1989 | Copeland et al. |
| 4,848,381 A | 7/1989 | Livingston et al. |
| 4,858,449 A | 8/1989 | Lehn |
| 4,867,196 A | 9/1989 | Zetena et al. |
| 4,867,343 A | 9/1989 | Ricciardi et al. |
| 4,872,763 A | 10/1989 | Higuchi et al. |
| 4,908,190 A | 3/1990 | Maglio et al. |
| 4,938,240 A | 7/1990 | Lakhan et al. |
| 4,964,185 A | 10/1990 | Lehn |
| 4,967,811 A | 11/1990 | DiGianfilippo et al. |
| 4,969,011 A | 11/1990 | Faull et al. |
| 4,976,137 A | 12/1990 | Decker et al. |
| 4,980,292 A | 12/1990 | Elbert et al. |
| 4,999,124 A | 3/1991 | Copeland |
| 5,014,211 A | 5/1991 | Turner et al. |
| 5,014,877 A | 5/1991 | Roos |
| 5,024,352 A | 6/1991 | Gmür et al. |
| 5,036,479 A | 7/1991 | Prednis et al. |
| 5,038,807 A | 8/1991 | Bailey et al. |
| 5,040,699 A | 8/1991 | Gangemi |
| 5,043,860 A | 8/1991 | Koether et al. |
| 5,053,206 A | 10/1991 | Maglio et al. |
| 5,064,094 A | 11/1991 | Roos et al. |
| 5,115,842 A | 5/1992 | Crafts et al. |
| 5,136,281 A | 8/1992 | Bonaquist |
| 5,147,615 A | 9/1992 | Bird et al. |
| 5,203,366 A | 4/1993 | Czeck et al. |
| 5,208,930 A | 5/1993 | Chabard |
| 5,219,224 A * | 6/1993 | Pratt ......................... 366/141 |
| 5,222,027 A | 6/1993 | Williams et al. |
| 5,240,326 A | 8/1993 | Evanson |
| 5,268,153 A | 12/1993 | Muller |
| 5,279,448 A | 1/1994 | Hanlin et al. |
| 5,283,639 A | 2/1994 | Esch et al. |
| 5,288,145 A | 2/1994 | Mackey et al. |
| 5,294,022 A | 3/1994 | Earle |
| 5,316,195 A * | 5/1994 | Moksnes et al. ......... 222/146.6 |
| 5,322,571 A | 6/1994 | Plummer et al. |
| 5,332,311 A | 7/1994 | Volk, Jr. et al. |
| 5,332,312 A | 7/1994 | Evanson |
| 5,340,211 A | 8/1994 | Pratt |
| 5,345,379 A | 9/1994 | Brous et al. |
| 5,369,032 A | 11/1994 | Pratt |
| 5,370,267 A | 12/1994 | Schroeder |
| 5,389,344 A | 2/1995 | Copeland et al. |
| 5,390,385 A | 2/1995 | Beldham |
| 5,397,028 A | 3/1995 | Jesadanont |
| 5,400,018 A | 3/1995 | Scholl et al. |
| 5,404,893 A | 4/1995 | Brady et al. |
| 5,407,598 A | 4/1995 | Olson et al. |
| 5,411,716 A | 5/1995 | Thomas et al. |
| 5,419,355 A | 5/1995 | Brennan et al. |
| 5,427,748 A | 6/1995 | Wiedrich et al. |
| 5,497,914 A | 3/1996 | Maltsis |
| 5,500,050 A | 3/1996 | Chan |
| 5,505,915 A | 4/1996 | Copeland et al. |
| 5,556,478 A | 9/1996 | Brady et al. |
| 5,580,448 A | 12/1996 | Brandreth |
| 5,584,025 A | 12/1996 | Keithley et al. |
| 5,584,079 A | 12/1996 | Wong et al. |
| 5,609,417 A | 3/1997 | Otte |
| 5,619,183 A | 4/1997 | Ziegra et al. |
| 5,625,659 A | 4/1997 | Sears |
| 5,625,908 A | 5/1997 | Shaw |
| 5,636,008 A | 6/1997 | LoBiondo et al. |
| 5,638,417 A | 6/1997 | Boyer et al. |
| 5,671,262 A | 9/1997 | Boyer et al. |
| 5,679,173 A | 10/1997 | Hartman |
| 5,681,400 A | 10/1997 | Brady et al. |
| 5,694,323 A | 12/1997 | Koropitzer et al. |
| 5,695,091 A | 12/1997 | Winings et al. |
| 5,724,261 A | 3/1998 | Denny et al. |
| 5,745,381 A | 4/1998 | Tanaka et al. |
| 5,757,664 A | 5/1998 | Rogers et al. |
| 5,758,300 A | 5/1998 | Abe |
| 5,759,501 A * | 6/1998 | Livingston et al. .......... 422/275 |
| 5,761,278 A | 6/1998 | Pickett et al. |

| | | | | | | |
|---|---|---|---|---|---|---|
| 5,762,096 | A | 6/1998 | Mirabile | 6,987,228 B1 | 1/2006 | MacMichael et al. |
| 5,769,536 | A | 6/1998 | Kotylak | 7,069,188 B2 | 6/2006 | Roberts |
| 5,777,895 | A | 7/1998 | Kuroda et al. | 7,128,215 B2 | 10/2006 | Danechi |
| H1743 | H | 8/1998 | Graves et al. | 7,201,290 B2 * | 4/2007 | Mehus et al. .................. 222/77 |
| 5,821,523 | A | 10/1998 | Bunte et al. | 7,410,623 B2 * | 8/2008 | Mehus et al. ................ 422/255 |
| 5,826,749 | A | 10/1998 | Howland et al. | 2001/0038018 A1 | 11/2001 | Bell et al. |
| 5,827,486 | A | 10/1998 | Crossdale | 2001/0039501 A1 | 11/2001 | Crevel et al. |
| 5,839,097 | A | 11/1998 | Klausner | 2001/0047214 A1 | 11/2001 | Cocking et al. |
| 5,851,291 | A | 12/1998 | Poterala et al. | 2001/0049846 A1 | 12/2001 | Guzzi et al. |
| 5,861,881 | A | 1/1999 | Freeman et al. | 2001/0053939 A1 | 12/2001 | Crevel et al. |
| 5,864,783 | A | 1/1999 | Struck et al. | 2001/0054038 A1 | 12/2001 | Crevel et al. |
| 5,875,430 | A | 2/1999 | Koether | 2002/0014496 A1 | 2/2002 | Cline et al. |
| 5,885,446 | A | 3/1999 | McGrew, Jr. | 2003/0031084 A1 | 2/2003 | Bartos |
| 5,887,975 | A | 3/1999 | Mordaunt et al. | 2003/0033156 A1 | 2/2003 | McCall |
| 5,897,671 | A | 4/1999 | Newman et al. | 2003/0033396 A1 | 2/2003 | McCall |
| 5,902,749 | A | 5/1999 | Lichtwardt et al. | 2003/0043688 A1 * | 3/2003 | Peterson et al. ............. 366/137 |
| 5,913,915 | A | 6/1999 | McQuinn | 2003/0121561 A1 | 7/2003 | Wagner et al. |
| 5,931,877 | A | 8/1999 | Smith et al. | 2003/0195656 A1 | 10/2003 | Gardner, Jr. et al. |
| 5,933,479 | A | 8/1999 | Michael et al. | 2004/0015269 A1 | 1/2004 | Jungmann et al. |
| 5,939,974 | A | 8/1999 | Heagle et al. | 2004/0088076 A1 | 5/2004 | Gardner, Jr. et al. |
| 5,945,910 | A | 8/1999 | Gorra | 2004/0162850 A1 | 8/2004 | Sanville et al. |
| 5,956,487 | A | 9/1999 | Venkatraman et al. | 2004/0216500 A1 | 11/2004 | Aouad |
| 5,961,561 | A | 10/1999 | Wakefield, II | 2004/0220844 A1 | 11/2004 | Sanville et al. |
| 5,967,202 | A | 10/1999 | Mullen et al. | 2004/0226755 A1 | 11/2004 | Pottebaum et al. |
| 5,973,696 | A | 10/1999 | Agranat et al. | 2004/0226959 A1 | 11/2004 | Mehus et al. |
| 5,974,345 | A | 10/1999 | Buck et al. | 2004/0230339 A1 | 11/2004 | Maser et al. |
| 5,975,352 | A | 11/1999 | Spriggs et al. | 2004/0232163 A1 | 11/2004 | Reinsch et al. |
| 5,979,703 | A | 11/1999 | Nystrom | 2005/0065644 A1 | 3/2005 | Gardner, Jr. et al. |
| 5,980,090 | A | 11/1999 | Royal et al. | 2005/0102059 A1 | 5/2005 | Gardner, Jr. et al. |
| 5,987,105 | A | 11/1999 | Jenkins et al. | 2005/0144737 A1 | 7/2005 | Roepke et al. |
| 5,992,686 | A | 11/1999 | Cline et al. | 2005/0269348 A1 | 12/2005 | Limback et al. |
| 6,003,070 | A | 12/1999 | Frantz | 2006/0173576 A1 | 8/2006 | Goerg et al. |
| 6,007,788 | A * | 12/1999 | Bellon et al. ................ 422/264 | 2007/0000291 A1 | 1/2007 | France et al. |
| 6,012,041 | A | 1/2000 | Brewer et al. | 2007/0154370 A1 | 7/2007 | Mehus et al. |
| 6,029,286 | A | 2/2000 | Funk | 2008/0058771 A1 | 3/2008 | De Brabanter |
| 6,049,792 | A | 4/2000 | Hart et al. | 2008/0271928 A1 | 11/2008 | Mehus et al. |
| 6,061,668 | A | 5/2000 | Sharrow | 2009/0126123 A1 | 5/2009 | Kim et al. |
| 6,073,124 | A | 6/2000 | Krishnan et al. | 2009/0151474 A1 | 6/2009 | Mehus et al. |
| 6,082,149 | A | 7/2000 | Woods | | | |
| 6,098,843 | A | 8/2000 | Soberanis et al. | FOREIGN PATENT DOCUMENTS | | |
| 6,120,175 | A | 9/2000 | Tewell | DE | 4419415 A1 | 12/1995 |
| 6,129,449 | A | 10/2000 | McCain et al. | DE | 10016659 | 10/2001 |
| 6,133,555 | A | 10/2000 | Brenn | DE | 100 39 408 A1 | 12/2001 |
| 6,136,184 | A | 10/2000 | King | EP | 0917906 A1 | 5/1999 |
| 6,143,257 | A | 11/2000 | Spriggs et al. | GB | 2 052 251 A | 5/1980 |
| 6,164,189 | A | 12/2000 | Anson | GB | 2 120 563 A | 12/1983 |
| 6,167,358 | A | 12/2000 | Othmer et al. | JP | 359142832 A | 8/1984 |
| 6,220,312 | B1 | 4/2001 | Hirsch et al. | JP | 360020122 A | 2/1985 |
| 6,234,218 | B1 | 5/2001 | Boers | JP | 360150823 A | 8/1985 |
| 6,259,956 | B1 | 7/2001 | Myers et al. | JP | 361098657 A | 6/1986 |
| 6,321,204 | B1 | 11/2001 | Kazami et al. | JP | 362168529 A | 7/1987 |
| 6,330,499 | B1 | 12/2001 | Chou et al. | JP | 363001434 A | 1/1988 |
| 6,356,205 | B1 | 3/2002 | Salvo et al. | JP | 401145525 A | 6/1989 |
| 6,357,292 | B1 | 3/2002 | Schultz et al. | JP | 401148916 A | 6/1989 |
| 6,370,454 | B1 | 4/2002 | Moore | JP | 401207124 A | 8/1989 |
| 6,377,868 | B1 | 4/2002 | Gardner, Jr. | JP | 404049110 A | 2/1992 |
| 6,380,495 | B1 | 4/2002 | Ash et al. | JP | 06226068 | 8/1994 |
| 6,418,371 | B1 | 7/2002 | Arnold | JP | 09066995 | 3/1997 |
| 6,438,471 | B1 | 8/2002 | Katagishi et al. | JP | 09066999 | 3/1997 |
| 6,441,322 | B1 | 8/2002 | Ash et al. | JP | 11-502932 A | 3/1999 |
| 6,463,940 | B1 | 10/2002 | Thomas et al. | JP | 11158101 | 6/1999 |
| 6,472,615 | B1 | 10/2002 | Carlson | WO | WO 98/26704 | 6/1998 |
| 6,490,513 | B1 | 12/2002 | Fish et al. | WO | WO 03/059143 A | 7/2003 |
| 6,507,966 | B1 | 1/2003 | Mitchell et al. | | | |
| 6,513,964 | B1 | 2/2003 | Himmelright et al. | | OTHER PUBLICATIONS | |
| 6,547,097 | B1 | 4/2003 | Cavallaro et al. | | | |
| 6,561,381 | B1 | 5/2003 | Osterheld et al. | | | |
| 6,697,706 | B2 | 2/2004 | Gardner, Jr. | | | |
| 6,707,873 | B2 | 3/2004 | Thompson et al. | | | |
| 6,719,453 | B2 | 4/2004 | Cosman et al. | | | |
| 6,792,395 | B2 | 9/2004 | Roberts | | | |
| 6,845,298 | B2 | 1/2005 | Nelson et al. | | | |
| 6,896,140 | B1 | 5/2005 | Perry | | | |

T-Jet 2000 PC "Wash-Aisle Productivity Manager Software Guide", ECOLAB Textile Care Division, 28584/4001/0399 (9207-4327).
Sample Reports consisting of 10 pages.
Sample Reports, Novalink System, 96-04620-00A, consisting of 8 pages.
Nova Controls, Nova News, "Save Money and Gain Sales Features?".
Novalink Overview Program Pricing.

Orion Liquid Laundry Supply Dispenser.

Novalink Laundry Information System, "ControlMaster Version 2.0 for Windows User's Guide".

PerSyst Inc. "LDAS-2000 Remote Information Control and Management System for the Commercial Laundry and Vending Industry".

PerSyst Inc. Dial-A-Wash Automatic Laundry Room Attendant For Apartment and Complex Laundry Rooms.

iNtOUCH Water Treatment Information Management Solution Statement of Work Presented to: ECOLAB (draft form), Mar. 29, 1999.

Brochure, Novalink, "The Laundry Information System" from Nova Controls.

Diverlog-L Enhanced "DLE—Production Summary Reports", Diversey.

Diverlog-L Enhanced "DLE—Set-up Report", Diversey.

Diverlog-L Enhanced "DLE—Single Cycle Reports", Diversey.

CLAX Diverflow System Advanced Central Dosing Technology For Laundries Sep. 10, 1999.

*We'd like to make a couple of things perfectly CLEAR, AQUABALANCE* Pool and Spa Management, Ecolab brochure, 1998 Ecolab Inc.

*White Paper*, Ecolab Balancer. Com, MRE Jun. 4, 1997.

*Relax. We've Got Your Pool Concerns Under Control, Ecolab Water Care Services*, 1998 Ecolab, Inc.

U.S. Appl. No. 11/713,964, filed Feb. 28, 2007, entitled, "Method and Apparatus for Mass Based Dispensing", Mehus et al.

Office Action dated Jul. 24, 2007 for U.S. Appl. No. 10/843,219, filed May 11, 2004, (13 pages).

Office Action dated Aug. 14, 2007 for U.S. Appl. No. 10/436,454, filed May 12, 2003, (5 pages).

Office Action dated Jan. 10, 2008 for U.S, Appl. No. 10/843,219, (16 pages).

U.S. Appl. No. 11/954,425, filed Dec. 12, 2007, entitled, "Low and Empty Product Detection Using Load Cell and Load Cell Bracket", Mehus et al.

Office Action dated May 2, 2008 for U.S. Appl. No. 10/436,454, (6 pages).

Notice of Allowance dated May 1, 2008 for U.S. Appl. No. 10/843,219, 8 pages.

Office Action dated Oct. 28, 2008 for U.S. Appl. No. 10/436,454, (6 pages).

Office Action dated Feb. 17, 2009, for U.S. Appl. No. 11/954,425, (13 pages).

Office Action dated Mar. 20, 2009, for U.S. Appl. No. 10/436,454, (7 pages).

The International Search Report and the Written Opinion of the International Searching Authority, for patent applicaion No. PCT/US2008/055107, mailed May 25, 2009, 8 pages.

Final Office Action dated Sep. 21, 2009 for U.S. Appl. No. 11/954,425, filed Dec. 12, 2007, (13 pages).

Office Action dated Oct. 22, 2009 for U.S. Appl. No. 10/436,454, (8 pages).

Notice of Allowance dated Dec. 17, 2009 for U.S. Appl. No. 11/954,425, (6 pages).

Office Action dated Dec. 21, 2009, for U.S. Appl. No. 11/570,411, (19 pages).

Office Action dated Apr. 7, 2009, for U.S. Appl. No. 11/570,411, (14 pages).

U.S. Appl. No. 12/711,892, filed Feb. 24, 2010, entitled "Low And Empty Product Detection Using Load Cell And Load Cell Bracket".

U.S. Appl. No. 12/567,266, filed Sep. 25, 2009, entitled "Make-Up Dispense In A Mass Based Dispensing System".

Office Action from U.S. Appl. No. 10/436,454, dated Apr. 21, 2010, 15 pp.

Response to Office Action dated Apr. 21, 2010, from U.S. Appl. No. 10/436,454, filed Jun. 21, 2010, 16 pp.

Office Action from U.S. Appl. No. 11/713,964, dated Jul. 7, 2010, 8 pp.

Response to Office Action dated Jul. 7, 2010, from U.S. Appl. No. 11/713,964, filed Oct. 6, 2010, 7 pp.

\* cited by examiner

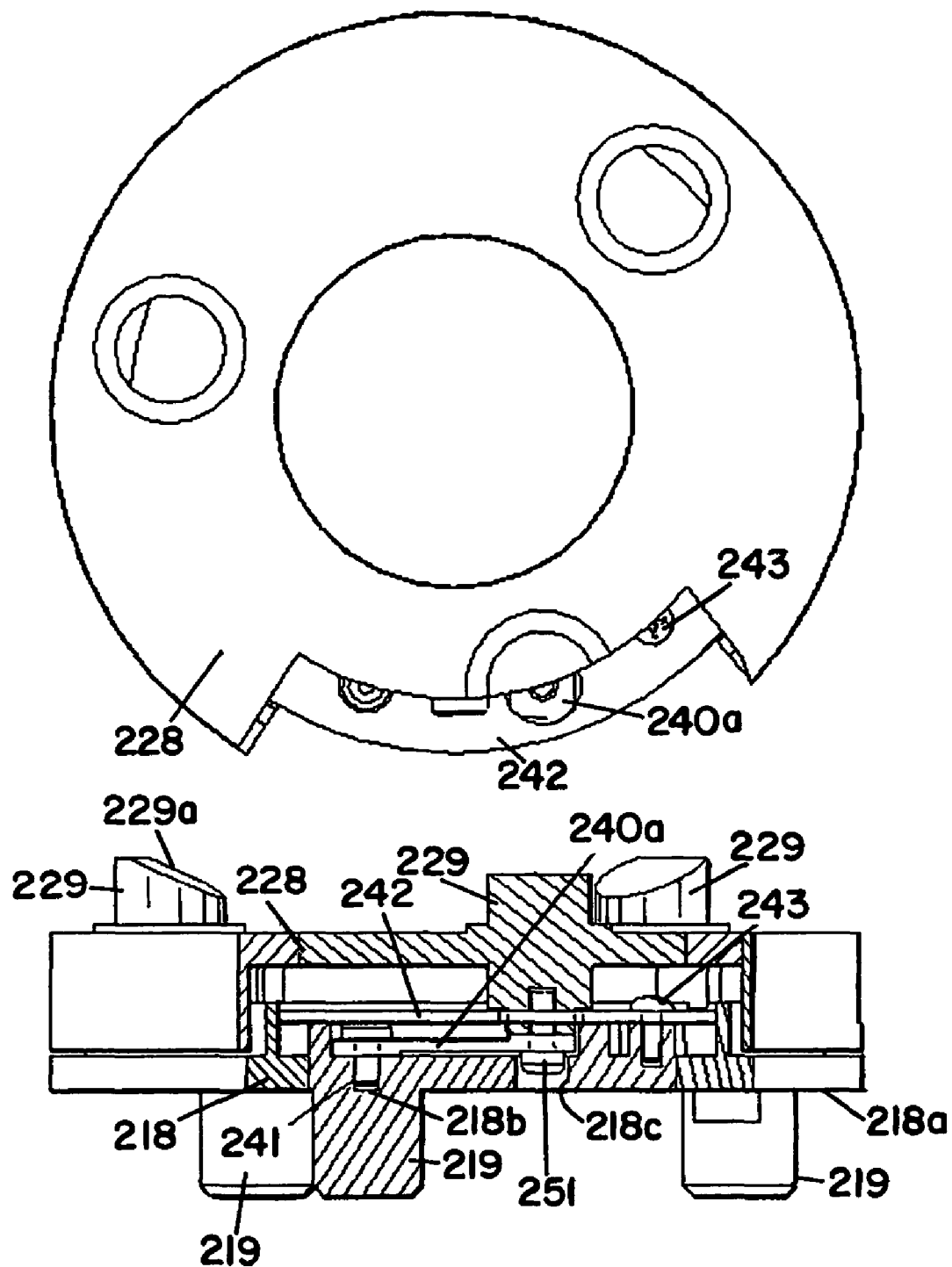

METHOD AND APPARATUS FOR MASS BASED DISPENSING

This application is a Continuation-In-Part of U.S. patent application Ser. No. 10/437,257 filed May 12, 2003 now U.S. Pat. No. 7,201,290.

BACKGROUND OF THE INVENTION

1. Field of the Invention

This invention relates generally to dispensers and more particularly to a method and apparatus for dispensing a product based on mass.

2. Description of the Prior Art

Dispensers that utilize a diluent to erode a product, such as a detergent, are well known. The product being dispensed is typically a solid product and can take the form of either a solid block of chemical, pellets or a cast product. One example of such a dispenser is found in U.S. Pat. No. 4,826,661 by Copeland et al. This patent discloses a solid block chemical dispenser for cleaning systems. The dispenser includes a spray nozzle for directing a uniform dissolving spray on to a surface of a solid block of cleaning composition. The nozzle sprays on the exposed surface of the solid block, dissolving a portion of the block and forming a product concentrate. This is just one example of a dispenser that uses a diluent and further is just one example of the type of product that may be dispensed. It is recognized that there are many different dispensers which utilize diluents to erode and dispense a portion of a product, which may have any number of forms.

Once the product is dispensed, it is often necessary to know how much of the product has been dispensed. There are at least two major types of systems that have been developed to determine the amount of product that has been dispensed. The first is based on the amount of time that the product is exposed to the diluent. While such systems are useful, the systems are more susceptible to changes depending upon the amount of product that is being exposed to the diluent, the pressure at which the diluent is supplied or the temperature at which the diluent is supplied. Therefore, in many applications, it is necessary to supply more product than what is actually required so it is known that a sufficient amount of product is supplied.

Another method that has been utilized is to test the conductivity of the concentrate solution to determine the amount of product that has been dispensed. Again, this system has its own unique problems such as the necessity of adding chemistry to the product to allow the dilute concentration to be tested. Further, the conductivity based dispensers typically require on/off cycling to achieve an asymptotic approach to the concentration set point. Conductivity is also influenced by product concentration as a function of temperature and total conductivity. Shielded cabling is often required for conductivity based dispensers.

The present invention addresses the problems associated with the prior art devices and provides for a method and apparatus for dispensing product based on mass.

SUMMARY OF THE INVENTION

In one embodiment, the invention is a dispenser for dispensing an amount of concentrate using a diluent to form a use solution. The dispenser includes a housing having a cavity, the cavity adapted to receive a concentrate. The housing has an inlet, whereby the diluent enters the cavity and erodes the concentrate to create a use solution. The housing has an outlet, whereby the use solution exits the cavity. A product holder is positioned to support the concentrate in the cavity of the housing. A load cell housing is operatively supported by the housing. More than one load cell is positioned in the load cell housing, the product holder supported on the more than one load cell, wherein weight of the concentrate is determined.

In another embodiment, the invention is a load cell housing for use with a dispenser for dispensing an amount of concentrate using a diluent to form a use solution. The load cell housing includes a first load cell having a first end and a second end. The load cell housing also includes a base member. A receiving area is operatively connected to the base member in which the first load cell is positioned. The first end of the first load cell is secured to the base member. A top member is positioned on the base member, the top member for carrying the concentrate. The second end of the first load cell is secured to the top member. A stop member is positioned under the first end of the first load cell to limit compression deflection and a printed circuit board is positioned above the first end of the first load cell to limit tension deflection of the first end.

BRIEF DESCRIPTION OF THE DRAWINGS

FIG. 15 is a top plan view of the cell load housing shown in FIG. 14, with a portion removed;

FIG. 16 is a cross-section view of a portion of the top housing and bottom housing showing cross section with the other components, not in cross section, to illustrate the assembly thereof;

DETAILED DESCRIPTION OF A PREFERRED EMBODIMENT

Figure 1:
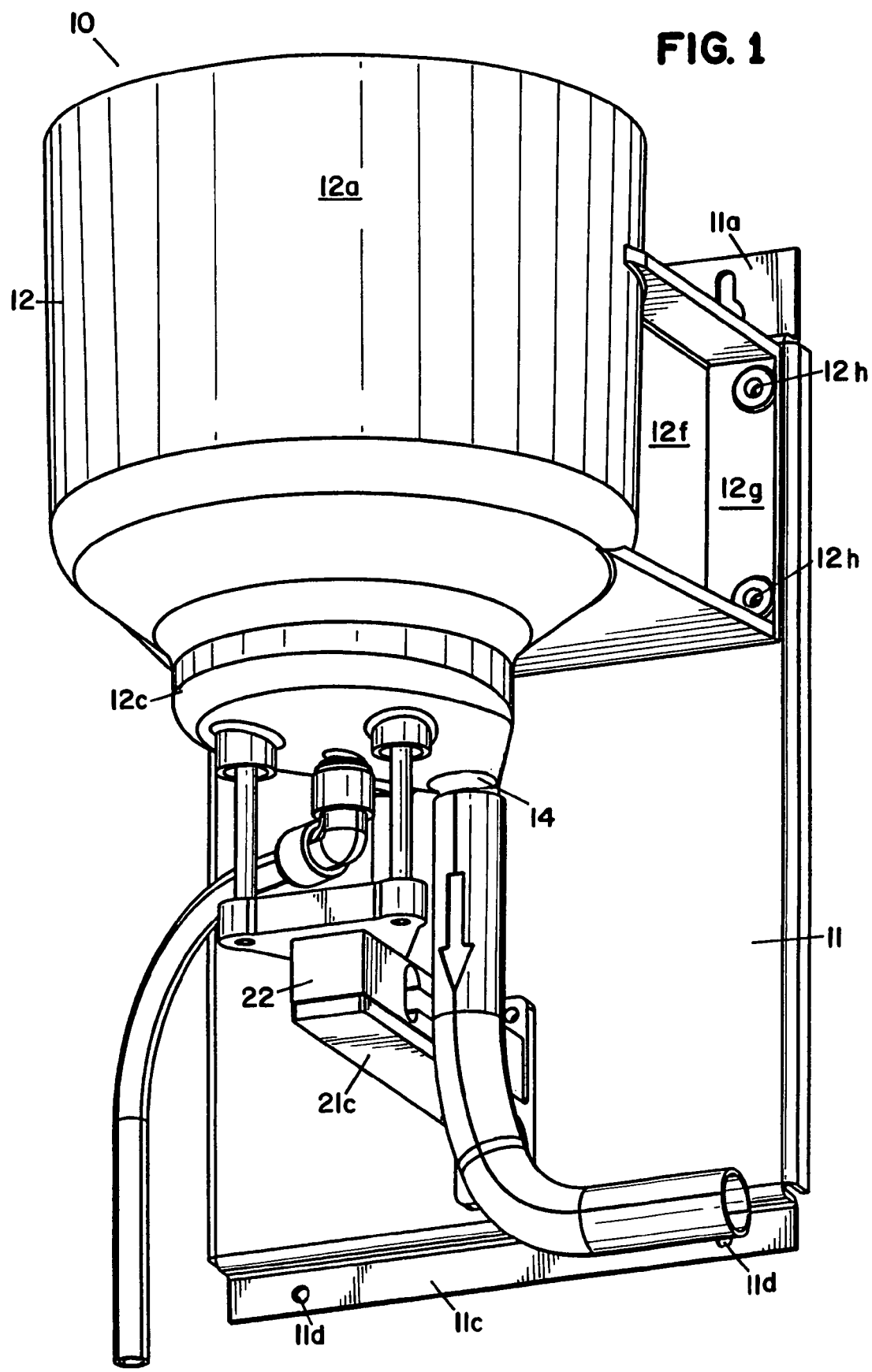
FIG. 1 is a perspective view, viewed generally from below, of the dispenser of the present invention.
Figure 2:
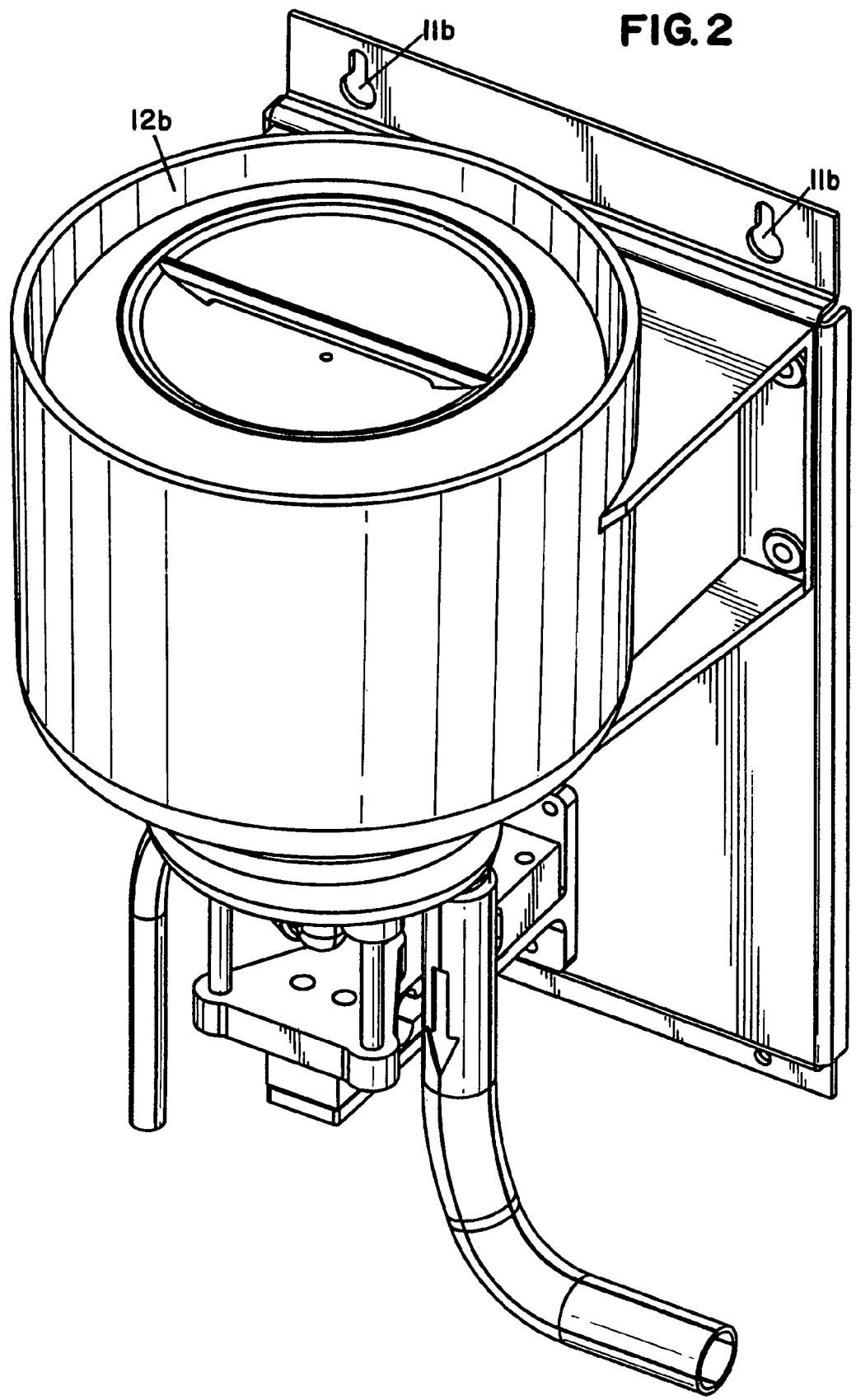
FIG. 2 is a perspective view, viewed generally from above, of the dispenser show in FIG. 1.

Referring to the drawing, wherein like numerals represent like parts throughout the several views, there is generally disclosed at 10 a dispenser. The dispenser 10 is shown mounted to a mounting panel 11 or other suitable mounting structure, which is suitable for mounting on a wall or other support surface (not shown). The support surface is typically a wall of a room, or a surface that is sturdy enough to support the dispenser 10. However, it is understood that the dispenser 10 may be mounted in various ways, well known in the art, including a free-standing dispenser. The mounting panel 11 is a support member and has a top flange 11a having two key way openings 11b. The openings 11b has a larger segment to allow the openings 11b to be placed over the head of a mounting bolt (not shown). The mounting bolt is secured into a mounting surface and the dispenser then drops down on the mounting bolt and is supported by the closed top of the openings 11b. A bottom flange 11c has two openings 11d, which are adapted to receive a fastener, such as a screw or bolt, to further fasten the mounting panel 11 to the mounting surface.

The dispenser 10 includes a housing 12 that is preferably molded as a one-piece plastic member, although it is understood that the housing 12 could be made out of other suitable material, such as stainless steel, and formed out of multiple pieces. The housing 12 has an outer wall 12a having a cavity 12b. The outer wall 12a has a larger diameter at the top so as to accommodate the capsule 20. The outer diameter of the outer wall 12a narrows at its base or sump region 12c. The sump region 12c, as will be described more fully hereafter, provides for a collection region for the use solution. The sump region 12c has an inlet 13 and an outlet 14. The inlet 13 is a cylinder that extends beyond the sump region 12c. The inlet has a bore 13a that provides for fluid communication into the cavity 12b. An inlet conduit, such as an inlet hose 15 has a first end 15a for connection to a diluent supply and a second end 15b which is operatively connected to a first end 16a of a connecting elbow 16. The second end 16b of the connecting elbow 16 is operatively connected to the inlet 13. The diluent is then able to enter the cavity 12b under pressure. A separate spray nozzle 30 may be utilized to further direct the diluent, as is well known in the art. The outlet 14 is an opening into the inner cavity 12b through which an outlet conduit, such as an outlet hose 17, is connected. This allows for the directing of the use solution to a desired location. The housing 12 has an upper flange 12d and a lower flange 12e. The flanges are connected by webs 12f, only one of which is shown, it being understood that a similar web is utilized on the left side of the dispenser 10, as viewed in the figures. A mounting member 12g extends between the flanges 12d, 12e and has two openings 12h through which a fastening member, such as a bolt, may be secured to secure the housing 12 to the mounting panel 11. A similar mounting member with openings is utilized on the left side of the dispenser, as viewed in the drawings.

Figure 4:
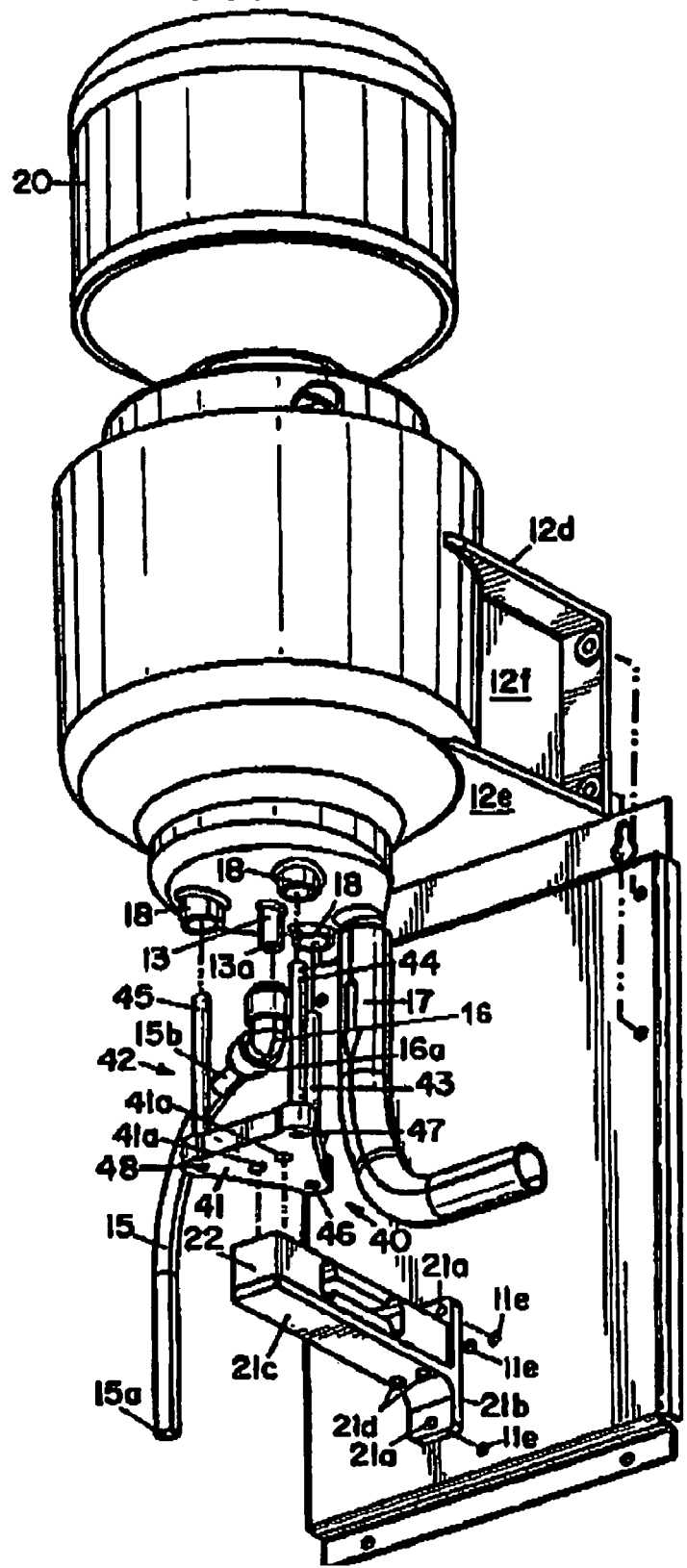
FIG. 4 is an exploded perspective view, viewed generally from below, of the dispenser shown in FIG. 1.
Figure 10:
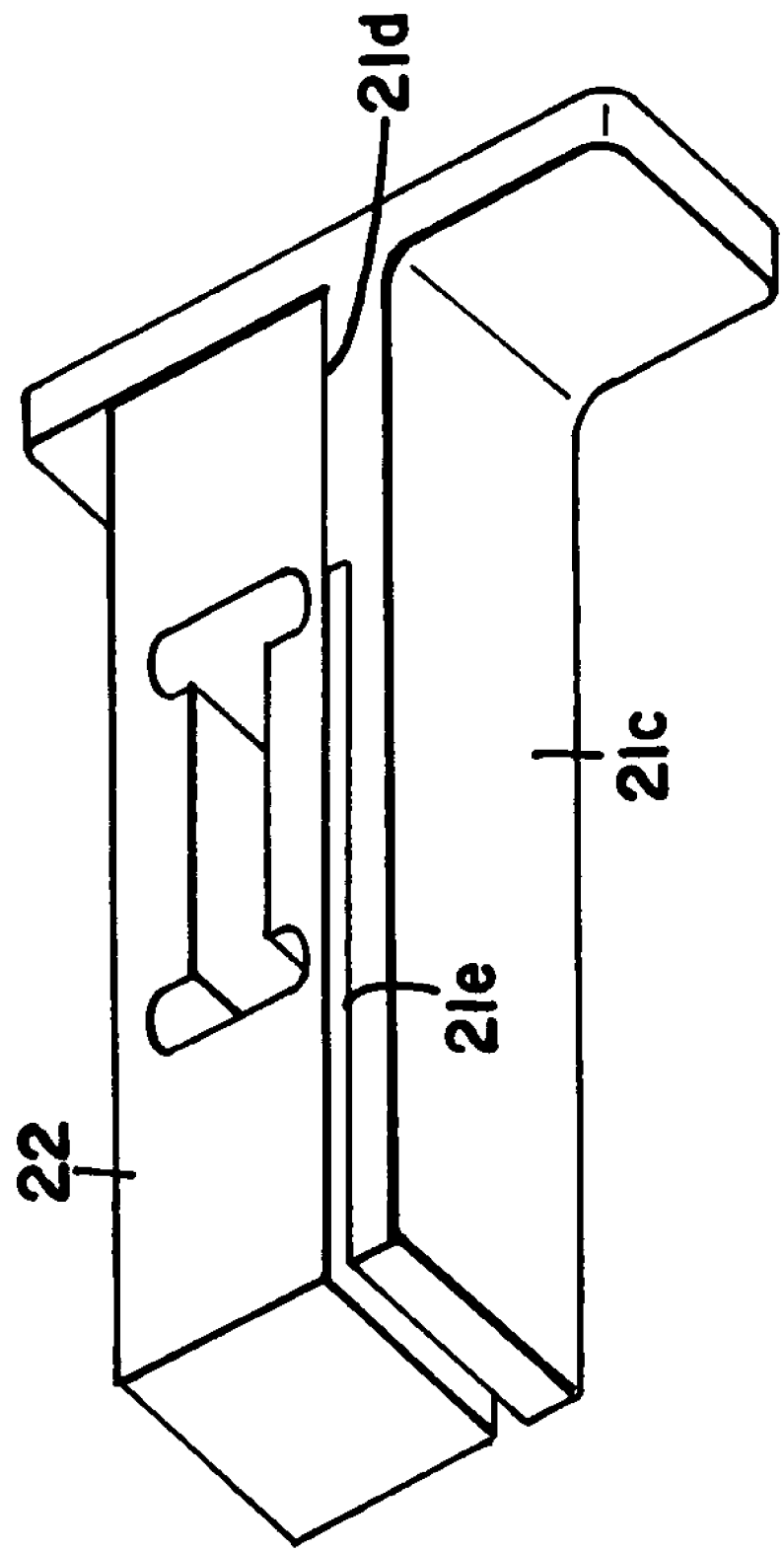
FIG. 10 is an enlarged perspective view of a portion of FIG. 1.

A support bracket 21 is operatively connected to the mounting panel 11 by suitable fastening means such as screws. The support bracket 21 is in a generally T-shape form and has three holes 21a formed in its base 21b. Only two of the holes 21a are shown in FIG. 4. FIG. 4 clearly shows where three holes 11e which are formed in the mounting panel 11. Appropriate fasteners, such as screws secure the bracket 21 to the panel 11 through three holes 21a and 11e. A support section 21c extends from the base 21b and provides for a support surface on which the load cell (or strain gauge) 22 is positioned. FIG. 10 is an enlarged perspective view of the support bracket 21 and load cell 22. The support section 21c has a top surface which is at two different heights. A first section 21d is a generally planar surface which supports the load cell 22. A second section 21e is a planar surface that is generally lower than the first section 21d and therefore is spaced from the load cell 22. The distance between the second section 21e and the load cell 22 is spaced at an appropriate distance, such as 150 percent of the maximum deflection of the load cell 22. The second section 21e therefore allows the load cell 22 to deflect downward. However, if the load cell 22 receives too large of a force, the second section 21e will limit the amount of deflection of the load cell 22.

The load cell 22 is secured to the support 21c of the support bracket 21 by any suitable method, such as screws (not shown), inserted through holes 21d. The type of load cell utilized would, of course, be dependent upon the weight to be measured. A typical weight of a capsule 20, with product, is between 8 to 10 pounds. Therefore, a 5 kilogram (11 pound) load cell was selected, although it is understood that other load cells would be selected depending upon the weight to be measured. One example of a suitable load cell is Load Cell Model RL-1521-5 kg provided by Rice Lake Weighing Systems, located at Rice Lake, Wis. As will be discussed more fully hereafter, a controller 23 having a keyboard 24 and a display 25 is connected to the load cell 22. The controller includes the necessary hardware and software to process the weight values detected by the load cell 22. The controller 23 may be any suitable controller. However, it has been found that a single chip scale such as SOC-3000/3001 by Cybertech Netanya Israel is easy to use. The single chip scale 23 includes the preamplifier, A/D Converter, display drivers, keyboard controller, serial communication, embedded CPU and field-programmable program and data memory.

Figure 3:
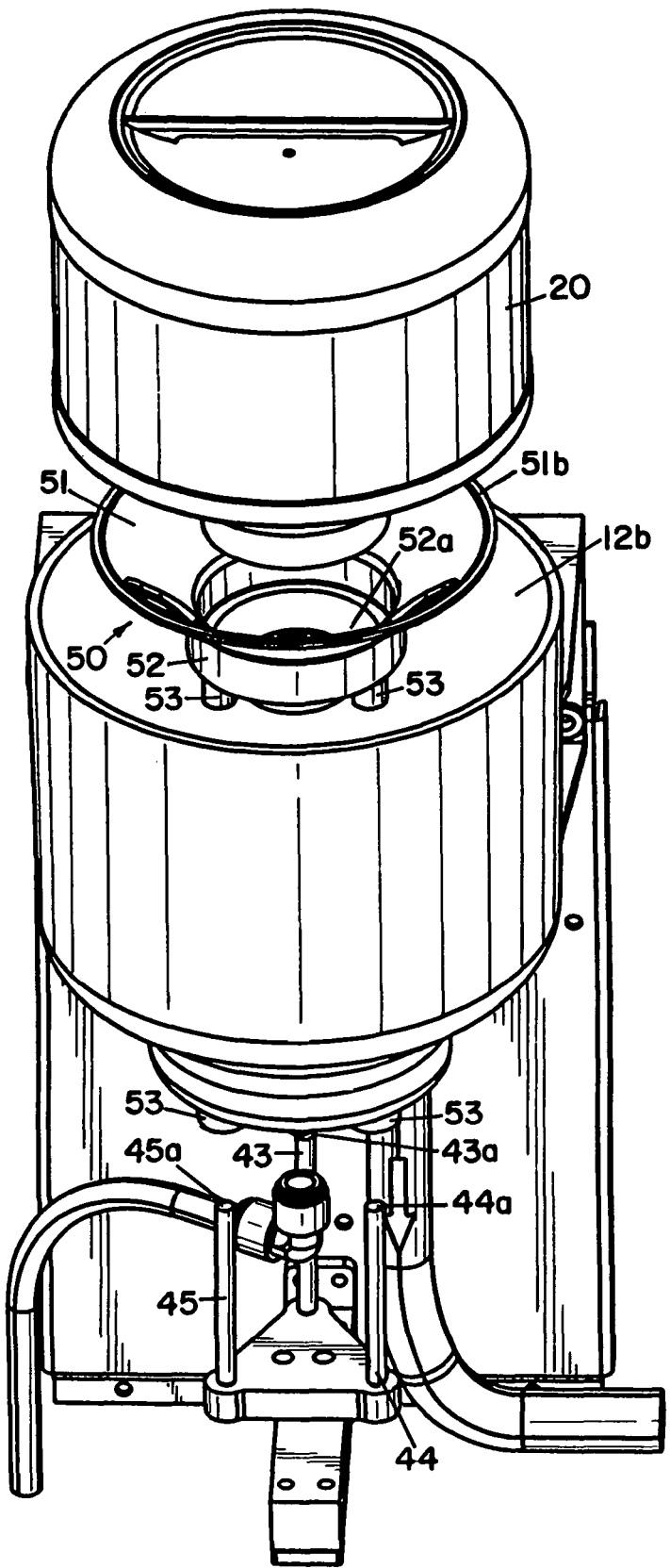
FIG. 3 is an exploded perspective view, viewed generally from above, of the dispenser shown in FIG. 1.
Figure 9:
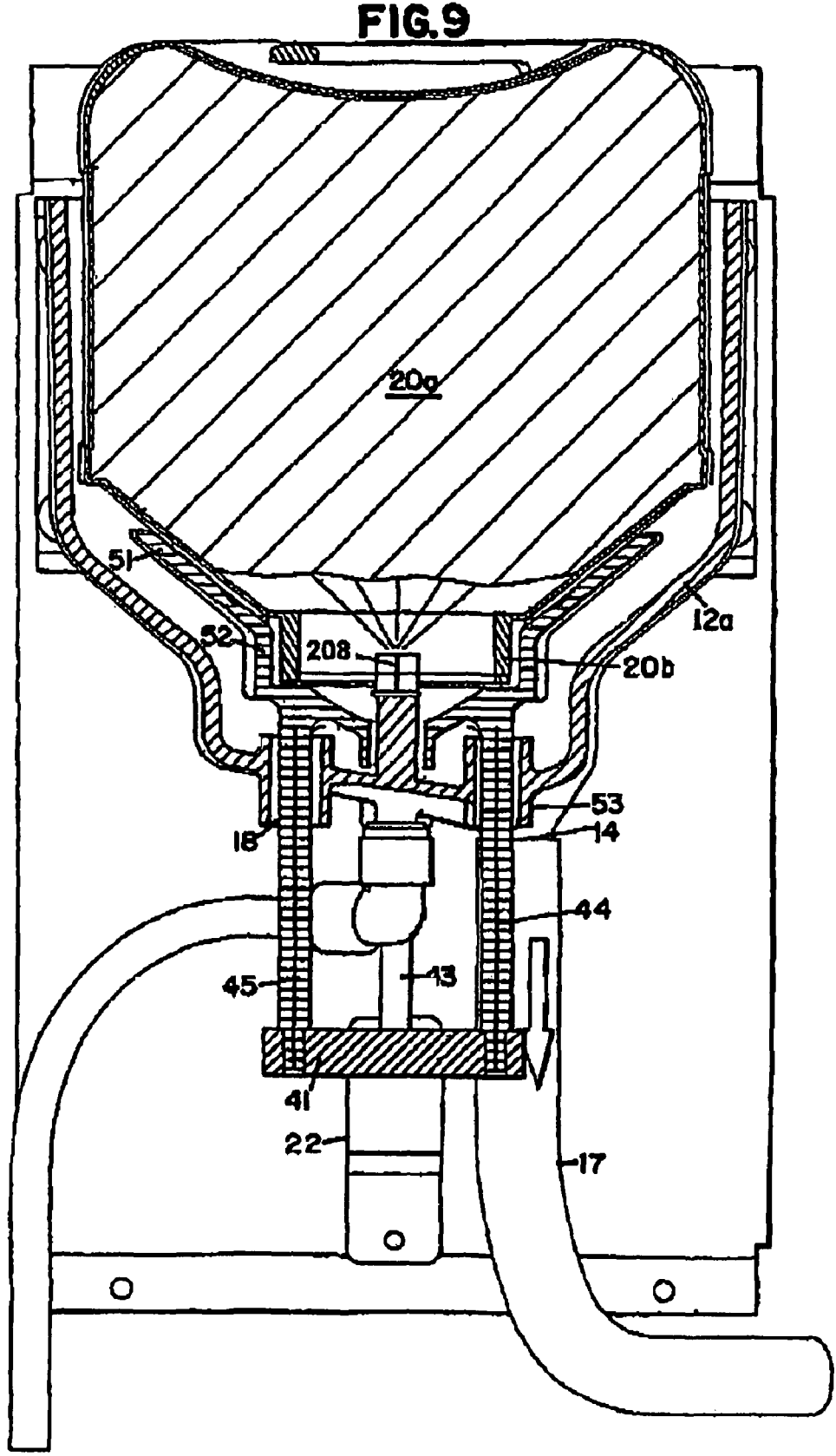
FIG. 9 is a cross-sectional view, taken generally along the lines 9-9 in FIG. 8, with a capsule.

Because the purpose of the load cell 22 is to determine the weight the product 20a inside the capsule or container 20 that is dispensed, the weight of the capsule 20 must be supported by the load cell 22. One structure for doing this is the use of a mounting bracket assembly, generally designated as 40, and a product holder 50. The mounting bracket assembly 40 has a triangular base 41. Two mounting holes 41a are formed therein and are used for fastening the base 41 to the load cell 22. Screws (not shown) are inserted through the holes 41a and into the load cell 22 to secure the base 41 to the load cell 22. A support arm, in the embodiment shown, has three arm sections 43-45. The arm sections 43-45 are of sufficient structural strengths to support the product holder 50 and capsule 20. The arm sections 43-45 are secured to the base 41 by suitable means such as a friction fit in bores 46-48. The arm sections 43-45 extend through the support openings 18 at the bottom of the housing 12. The upper ends, 43a-45a of the arm sections 43-45 support the product holder 50. It is preferred, but not necessary, that the arms 43-45 and product holder 50 are a one-piece construction. The exploded views, FIGS. 3-4, show the arms 43-45 as not being integral with the product holder 50. This is for illustrative purposes only. Therefore, the actual construction is as shown in FIG. 9, wherein the arms 43-45 are integral with the product holder 50, however, it is understood that they may be made of a multiple piece-part construction. The product holder 50 has an upper, conically shaped member 51 in which three holes 51a are formed. The holes 51a are provided for making it easier to lift the product holder 50. The conical member 51 has a top rim 51b. The conical member 51 is operatively connected to a generally cylindrical section 52. The cylindrical section 52 has a bore 52a which is sized and configured to receive the neck portion 20b of the capsule 20. Three cylindrical projections 53 depend downward from the sump section 12c. Only two of the projections 53 are shown in FIG. 3, it being understood that the projections 53 are positioned to receive the arm sections 43-45. The cylindrical projections 53 have a bore 18 formed therein. Accordingly, the arms 43-45 of the product holder 50 are placed through the bores 18 and the arms 43-45 are secured, by suitable means, to the base 41. Then, when the capsule 20 is placed in the product holder 50, the weight of the capsule 20, the product inside of the capsule 20a, the product holder 50 and mounting bracket assembly 40 are all supported on the load cell 22.

The capsule 20 is shown as being generally cylindrical and having a neck 20b. The neck 20b forms an opening into which the product 20a is filled. A cap is then placed on the capsule 20 and the capsule is in condition for packaging and shipment. When the user utilizes the capsule 20, it is necessary to remove the cap so that the product 20a is exposed to the diluent spray. It is understood that other shapes and configurations may also be used, with the associated redesign of the dispenser to accommodate any different shapes or sizes. It is also understood that in addition to using different sized containers or capsules 20, the product holder could easily be redesigned to accept briquettes, powders or blocks of product that are not inside of a container. One way of doing so would be to have a screen across the product holder with walls or screens extending upward to hold the loose product. The dispenser would be designed such that the weight again is carried by the load cell 22. This would allow again, many different types of ingredients to be dispensed. Further, the dispenser 10 is shown as having a spray that sprays upward to erode the product 20a. It is also understood that other designs could utilize the present invention and have the diluent enter at other locations. It is also understood that the weight based system may be utilized to dispense a product that does not have to be eroded the product to be dispensed. The erosion may be by spray, as previously described, or by flooding. The product may also be ground away or drilled out by mechanical action. It is therefore seen that there are a number of ways to erode the product 20a. A preferred embodiment, and the way shown in the Figures, show the use of a diluent to dissolve the product 20a. However, the eroding of the product 20a may also take place by other mechanical methods, such as drilling or grinding.

The present invention has applicability in many areas in addition to those already discussed. The following is a list of at least some of the areas in which the invention may be used. In the area of pest elimination dispensing equipment, a load cell could be utilized to measure a pre-set amount of ready-to-use insecticide which would enable the user to document proof of delivery for regulatory compliance, while ensuring a consistent dose was used for each application. Use in the vehicle cleaning market could encompass the use of a chemical measurement device for a vehicle care product dispenser. The product could be in a solid, liquid or gel form. Delivery would be by conventional means such as a recirculating system for solid products or pump systems for liquids or gels. The load cell would measure precise weight changes in the product being delivered from a concentrate to create a ready-to-use solution or an intermediate solution that can be diluted at a user's convenience. The prior art procedures require chemical or volumemetric measurements by operators of product usage to ensure reproducible product delivery. As each product type varies greatly in chemical components for vehicle cleaning products, different chemical tests need to be developed and validated for each new product. Batch to batch variations in solid dissolution rates require very stringent quality control measures and greatly restrict new product development of solid systems. Large variations in product use temperature due to seasonal temperature variations in the vehicle cleaning market have negative effects on liquid product viscosities. Water pressure variations within vehicle cleaning sites result in wide changes in product delivery as many dilution systems are based on siphon technology. These variations often result in unacceptable differences in product delivery. All of the variations require human intervention to adjust the chemical delivery system. The use of the load cell technology would permit reproducible delivery of product regardless of chemical composition. This presents the possibilities of greater flexibility and product formulation. Concerns about variation in solid product solubility differences or liquid viscosity changes with temperature would be eliminated as only weight changes are measured. Simplicity of the dispenser design would also result as the same dispenser technology could be used for many product chemistries since chemical measurement systems do not need to be taken into account for each product.

Still another area where the present invention could be utilized is in the janitorial and health care areas. The janitorial business would be able to utilize the technology of the present invention for accurately dispensing two component chemistries as well as cross linking chemistries for floor care. For health care, the present invention would be able to be utilized for proof of delivery for sanitizers and disinfectants. There is also the need to deliver very accurate amounts of chemistry for instrument care and hard surface cleaning. The technology would be available for both liquid and solid products. The present invention is also applicable for Housekeeping. The invention is able to be utilized as a platform for accurate solid, liquid or concentrate proportioning when it is used in conjunction with a device that can quantify an amount of water passing through a pipe. For example, if a known volume of water is used, and the load cell could detect the amount of concentrate dispensed, a proportion would be known. So in an accurate dispenser of this kind, the user would set a proportion. While water is filling up the use vessel, the concentrate is dispensed. Dispensing the concentrate occurs until the proportion is satisfied. If a known amount of water is passed through a pipe in a fixed time, the dispenser could dispense the concentrate to satisfy the proportion. For example, if 100 milliliters of water is passed through the dispenser, a known amount of concentrate would be needed to satisfy the set proportion. The known amount of concentrate could be dispensed and stopped, when the load cell is satisfied.

The present invention is also applicable for laundry systems. Present laundry systems service two machines at a relatively high cost. The system is both complex and costly. The load cell technology of the present invention would reduce both the cost and complexity of a current laundry dispenser. Further, the current laundry system for liquid also has significant drawbacks in that there is no empty drum alarm and no way to compensate for the reduced output of the peristaltic pump dispensing. Load cell technology of the present invention would allow for accurate dispensing of the peristaltic pump over time, providing a signal of when to change the squeeze tube, and allow and empty warning device. These would be significant improvements over the prior art. The foregoing is not an exhaustive list but are just further examples of the applicability of the present invention.

Figure 6:
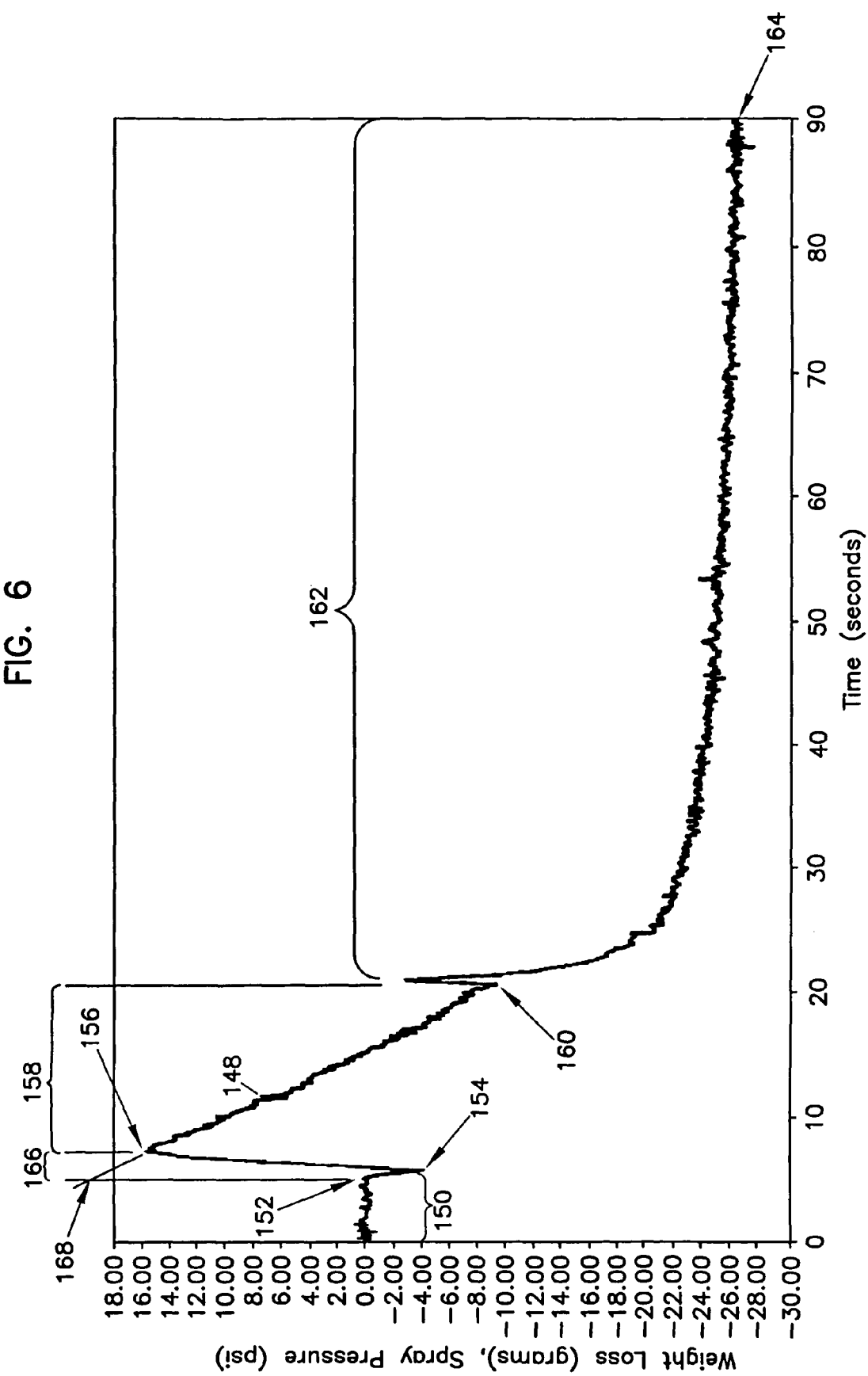
FIG. 6 is a chart illustrating the weight of a dispensing ingredient of the dispenser of FIG. 1.
Figure 7:
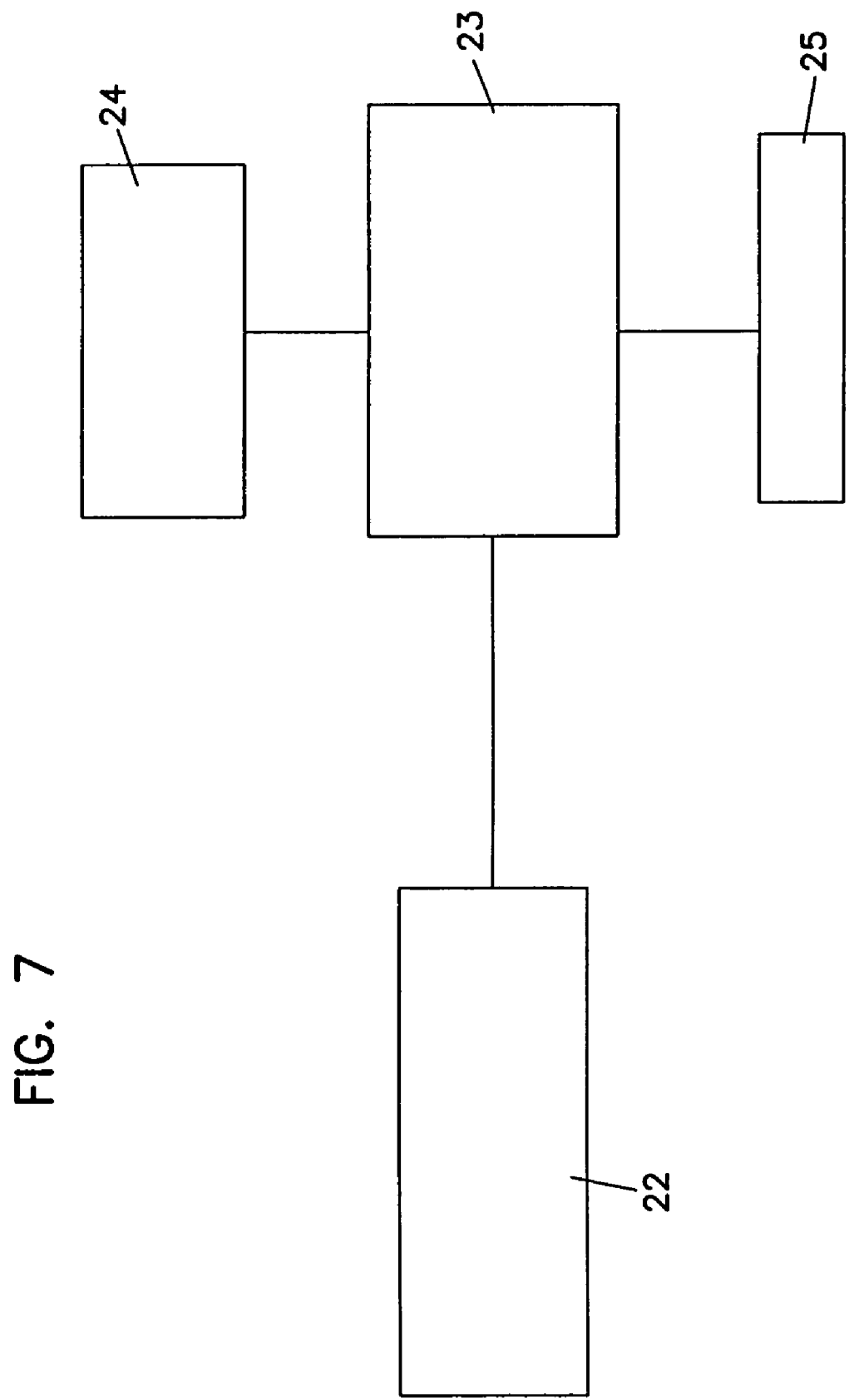
FIG. 7 is a schematic of a portion of the dispenser shown in FIG. 1.
Figure 8:
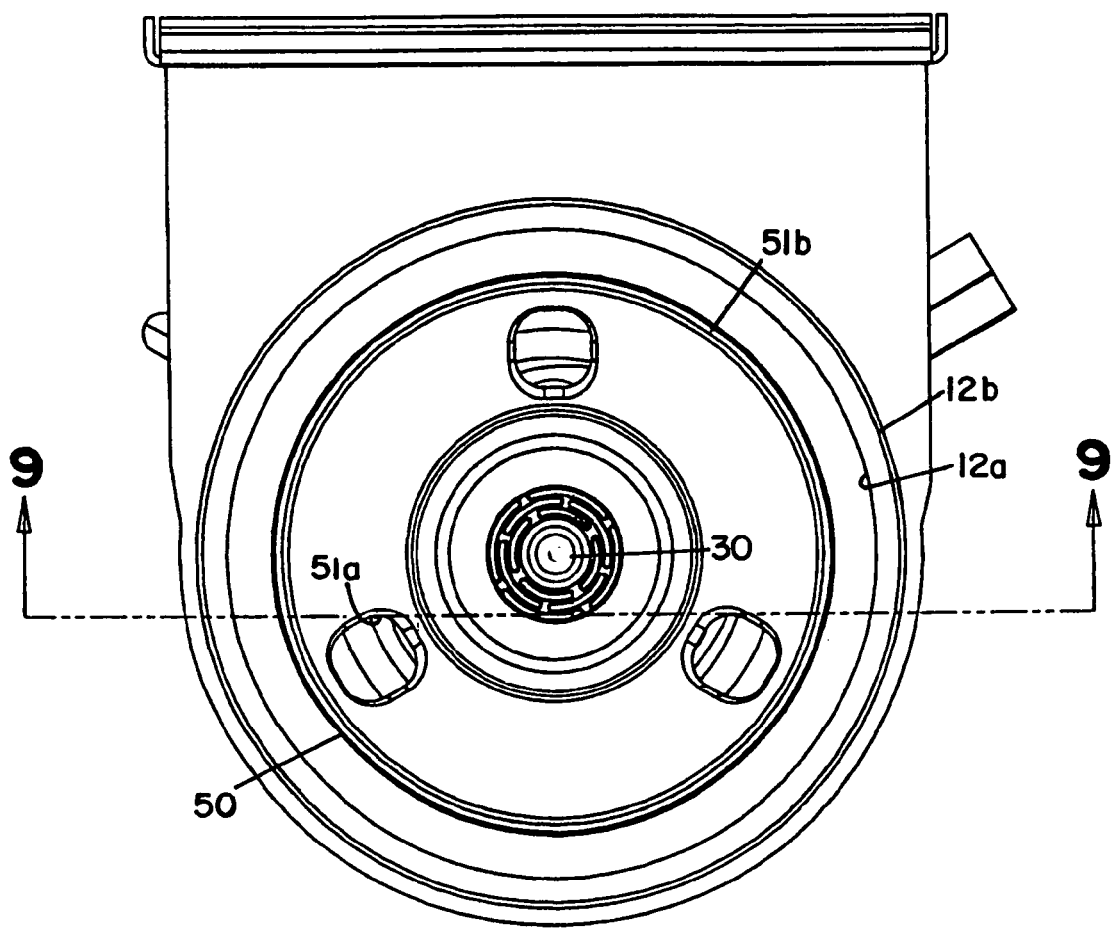
FIG. 8 is a top plan view of the dispenser shown in FIG. 1.

FIG. 6 is a chart illustrating the effect of the spray of diluent onto the block of ingredient in the dispenser of FIG. 1. The mantissa is time and the ordinate is weight in grams. Time 150 before the initiation of spray represents the starting combined weight, netted out at approximately zero (0) grams, for purposes of illustration. Spray is initiated at time 152 at which point two things begin to happen. First, pressure from the diluent sprayed on the underside of the block of ingredient relieves some of the combined weight from load cell 22. Second, the added weight from diluent accumulating in capsule 20 tends to cause an increased combined weight. Thus, the combined weight on load cell 22 initially decreases until time 154 at which point the combined weight reaches an initial minimum of approximately minus four (−4) grams. Following time 154, the added weight of the diluent in capsule 20 causes the combined weight to rather significantly increase. Over time, however, the added weight of the diluent in capsule 20 tends to stabilize as the block of ingredient is eroded. As the block of ingredient is eroded, its weight decreases. Thus, at time 156 the combined weight reaches a maximum at approximately sixteen (16) grams. Following time 156 the block of ingredient continues to be eroded as the diluent continues to spray. Since the added weight of the diluent in capsule 20 has stabilized, the combined weight continues to decrease during time 158 until the spray is discontinued. The spray of diluent is discontinued at time 160 causing a momentary weight gain for the combined weight as the upward pressure on the block of ingredient is discontinued. Following a momentary weight gain cause by the lack of upward pressure on the block of ingredient by the spray of diluent, diluent continues to drain from capsule 20 during time period 162 resulting in the near final weight at time 164 of approximately minus twenty-six (−26) grams.

The difference between the starting weight at time 150 of approximately zero (0) grams and the ending weight of approximately minus twenty-six (−26) grams, once the diluent has drained from capsule 20, of twenty-six (26) grams represents the amount of ingredient dispensed. However, note that the difference between the maximum weight of approximately sixteen (16) grams and the weight at time 160 of approximately minus nine (−9) grams when spray is discontinued is only twenty-five (25) grams. This is because ingredient was eroded from the block of ingredient during time 166, between time 152 when spray is begun and time 156 when the maximum is measured, and also during time 162 as diluent drains from capsule 20.

Figure 5:
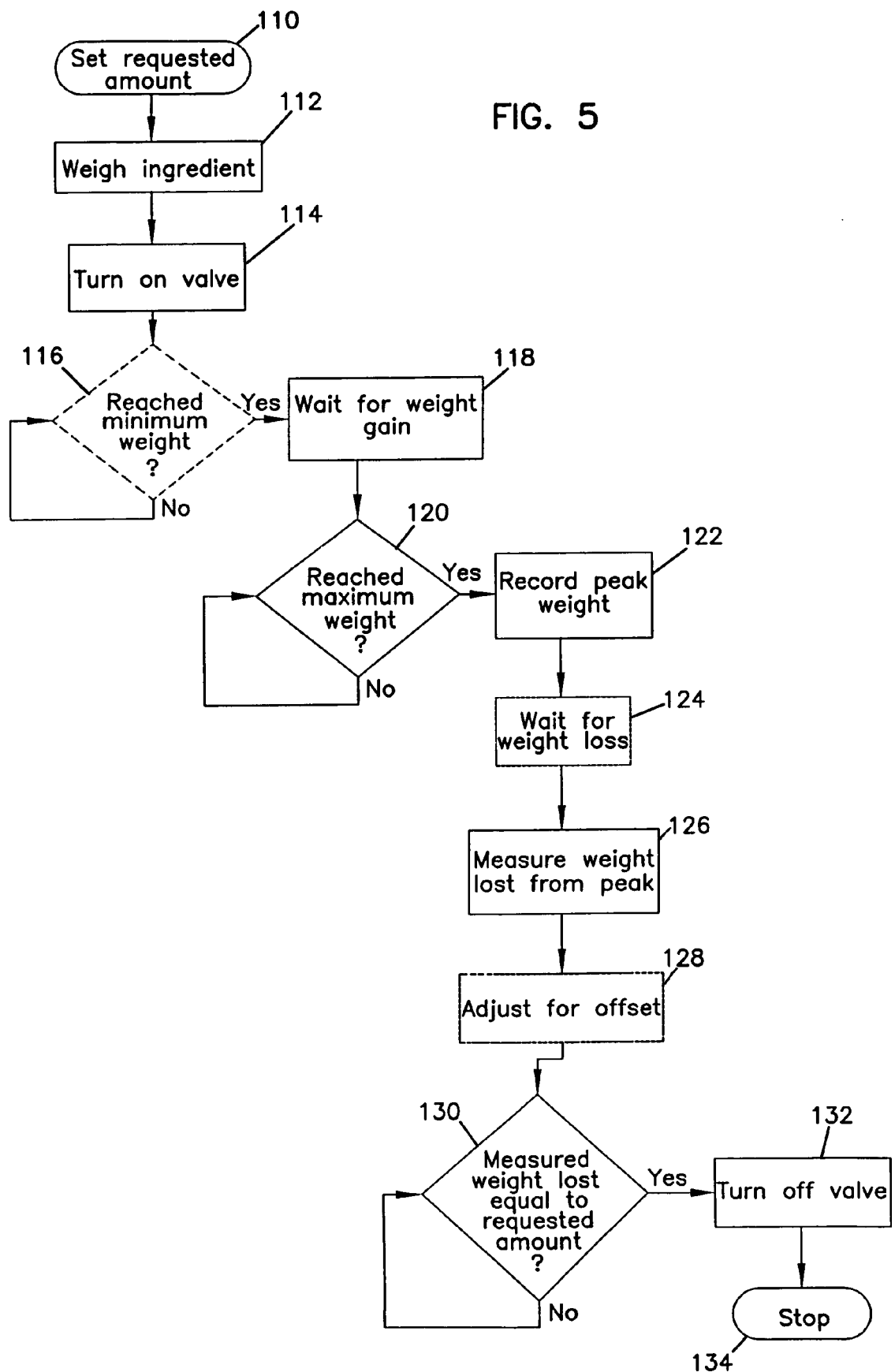
FIG. 5 is a flow chart illustrating an embodiment of the invention in which an ingredient is dispensed by eroding the ingredient with a diluent.

This process can be more readily understood with reference to the flow chart of FIG. 5. A requested amount of the ingredient requested is set (block 110). Load cell 22 weighs the ingredient (block 112). A valve is turned on (block 114) at time 152 initiating the spray of diluent against the block of ingredient. Optionally, the process waits (block 116) for a minimum weight at time 154 to be reached. The process waits (block 118) for diluent being added by spray to accumulate in capsule 20 and increase the combined weight. Note that if the step represented by block 116 is omitted, it is still proper to wait for weight gain in block 118. Alternatively, if the step represented by block 116 is not omitted then it is no longer necessary to wait for weight gain and the step represented by block 118. Alternatively, the steps represented by both blocks 116 and 118 could be omitted in the process could continue directly to block 120. In block 120, the method searches for a maximum combined weight at time 156 and, once found, records that peak weight (block 122). Again optionally, the process waits for weight loss (block 124). Load cell 22 measures (block 126) the amount of weight lost from the maximum or peak weight recorded. Optionally, the process adjusts for an offset (block 128) which is explained below. The process determines (block 130) whether the measured weight lost is equal to an amount which will result in a dispensed amount of ingredient which equals the requested amount. When such a determination is made, the valve is turned off (block 132) discontinuing the spray of diluent against the block of ingredient. The process stops (block 134) until the process is repeated by again setting a requested amount (block 110).

Since some ingredient will be eroded from the block of ingredient during time 166 (between time 152 when spray is initiated and time 156 when weight loss begins to be recorded) and during time 162 (while remaining diluent drains from capsule 20), the amount of weight lost from capsule 20 during time 158 does not necessarily equal the total weight of the ingredient eroded and, hence, dispensed. However, an amount of the ingredient which is additionally dispensed during time 166 and time 162 can be calculated and/or estimated by a variety of means. For example, this amount can be determined empirically from previous dispensed cycles. Alternatively, the slope of curve 148 during all or a portion of time 158 may be determined and an original maximum 168 may be determined by regression to account for an amount of the ingredient eroded during time 166. The amount of additional ingredient eroded during times 166 and 162 can be accounted for in the method in block 128 by adjusting the time 160 at which the spray of the diluent is discontinued. For example, if it is determined that the additional amount of the ingredient dispensed during time periods 166 and 162 is equal to approximately one (1) gram, then time 160 can be adjusted to turn off the spray of diluent when the measured weight loss is equal to the requested amount of ingredient minus one (1) gram.

The method of the present invention is described further in co-pending U.S. application Ser. No. 10/436,454, filed May 12, 2003, entitled "Methods of Dispensing" by Richard Mehus et al.

One issue in designing a mass-based dispenser is to protect the load cell from vertical shock load. One method of doing so is to use the support bracket 21 to prevent the load cell 22 from deflecting beyond its maximum. In addition, another way to further reduce the vertical shock load would be to isolate the capsule 20 from the product holder 50 as the capsule 20 is being loaded. This can be accomplished by using a cylinder within a cylinder concept. That is, an additional cylinder (not shown) would be added to the dispenser 10. The additional cylinder would be designed and configured to receive the capsule 20. However, as the cover (not shown in the figures, but which would sit on top of the housing 12) is raised, the cylinder would also raise. Then the capsule would be loaded into the cylinder and the capsule 20 would not be able to come into contact with the product holder 50. That is, the cylinder would prevent the capsule from going all the way down to the product holder. Then as the cover is lowered, the cylinder, holding the capsule 20, is lowered and allows the capsule 20 to rest on the product holder 50.

Another issue to consider in designing a load cell dispenser is to minimize the torque and to provide strain protection for the load cell. One way of addressing this issue is to align the forces above the load cell so that they are vertical onto the load cell 22. Also, by securing the housing 12 to the mounting panel 11 and securing the support bracket 21 to the panel 11, strain protection is provided. In addition, the skirt or housing will provide for load cell isolation so that the load cell 22 is not jarred or moved inadvertently by someone passing by or other sources of force which may contact the load cell 22.

Another issue to be considered is to prevent moisture from contacting the load cell 20. There are several ways of addressing this issue. One design would be to use a hood which would cover the dispenser 10 and prevent the load cell from becoming wet from splashes or sprays, if the dispenser 10 was being used in an environment where there could be sprays, such as from dishwashers. Coating the load cell 22 with a moisture protective coating may prove beneficial. Also, when the dispenser 10 is used as a spray up dispenser, as is the dispenser shown in this embodiment, having the tops of the support openings 18 extend above the bottom of the sump region prevents water or spray from readily going down the opening 18 on to the load cell 22.

Still another issue is the reduction of any vibration interference and the protection that provides for the same. One way of doing so is to electronically compensate for the vibration with logic in suitable software. Another solution is to physically isolate or insulate the dispenser 10 from the mounting surface. Industry standard cushioning materials such as air chambers or rubber may be utilized. This will assist in avoiding the resonate frequency.

In addition, there are other beneficial designs that may be incorporated into the dispenser 10. In instances where a capsule is not utilized, such as the use of a solid block of product, the actual shape of the product may be utilized to lock out the dispenser 10 to make certain that the right product is dispensed for the right dispenser. This would avoid, for example, putting a detergent block into a dispenser when a rinse aid should be in the dispenser. The products sold under the trademark GEOSYSTEM by Ecolab Inc. are one example of such products that may be used without a capsule. When a capsule is utilized, the packaging design of the capsule may be utilized to design lock-out systems to ensure that the right product is dispensed from the correct dispenser. Also, designs may be utilized that provide for electrical lock outs. Package identification systems such as radio frequency identification systems may be incorporated into the capsule 20, as well as bar codes which may be read electronically, to adjust the dispensing profiles based on the product sensed.

Figure 11:
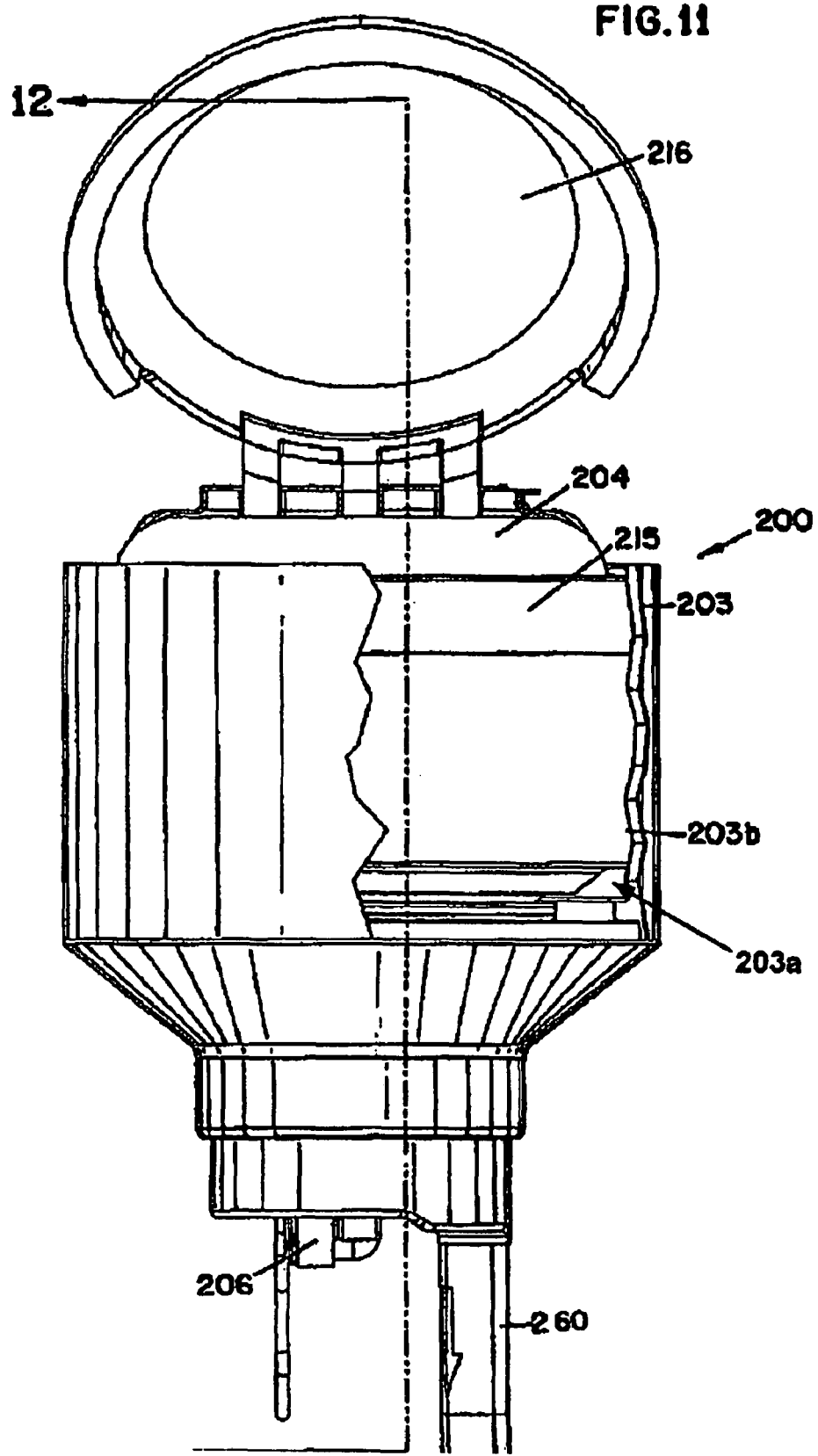
FIG. 11 is a front elevational view, of another embodiment of a dispenser of the present invention, with portions broken away.
Figure 13:
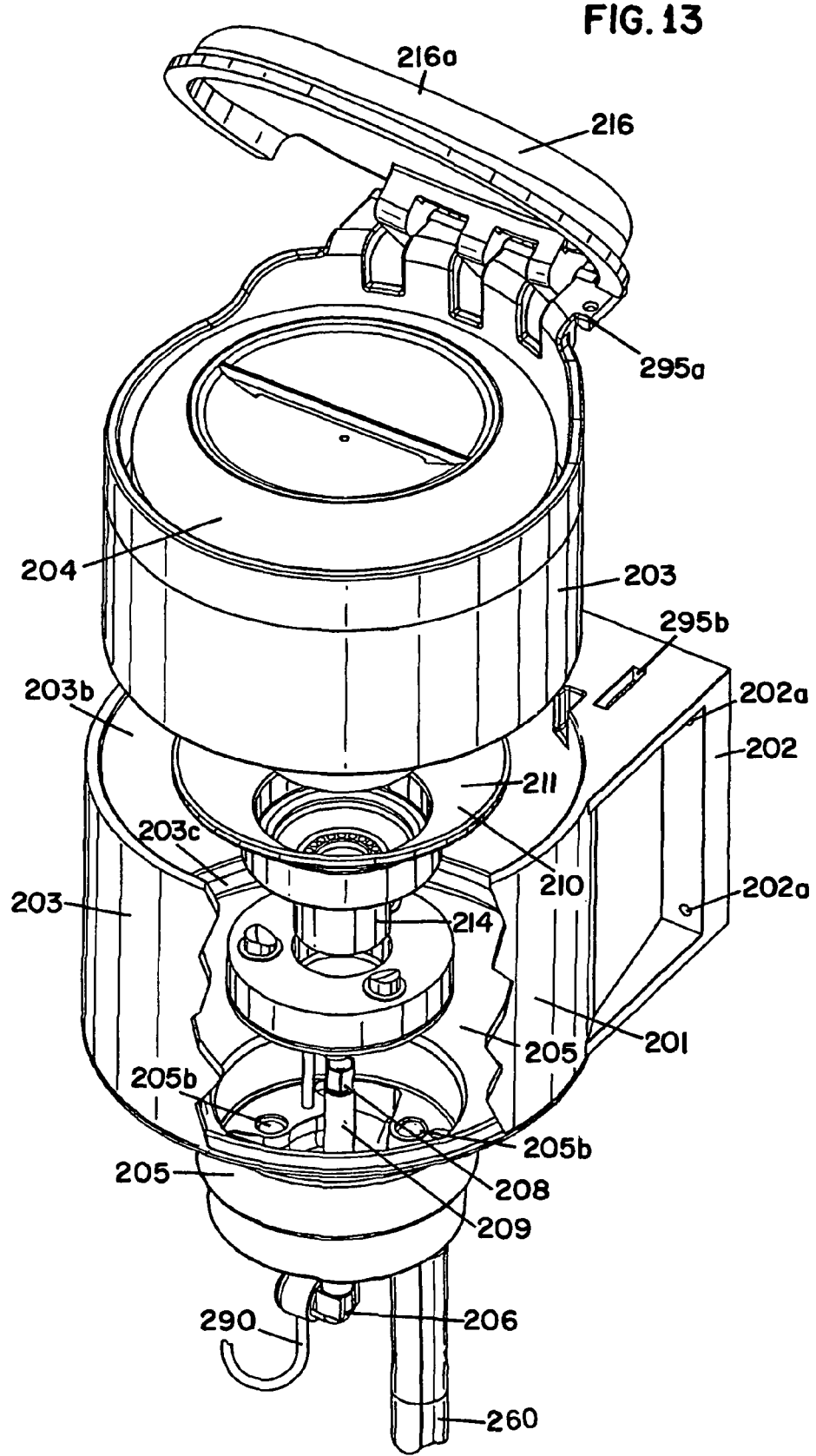
FIG. 13 is an exploded perspective view of the dispenser shown in FIG. 11.
Figure 14:
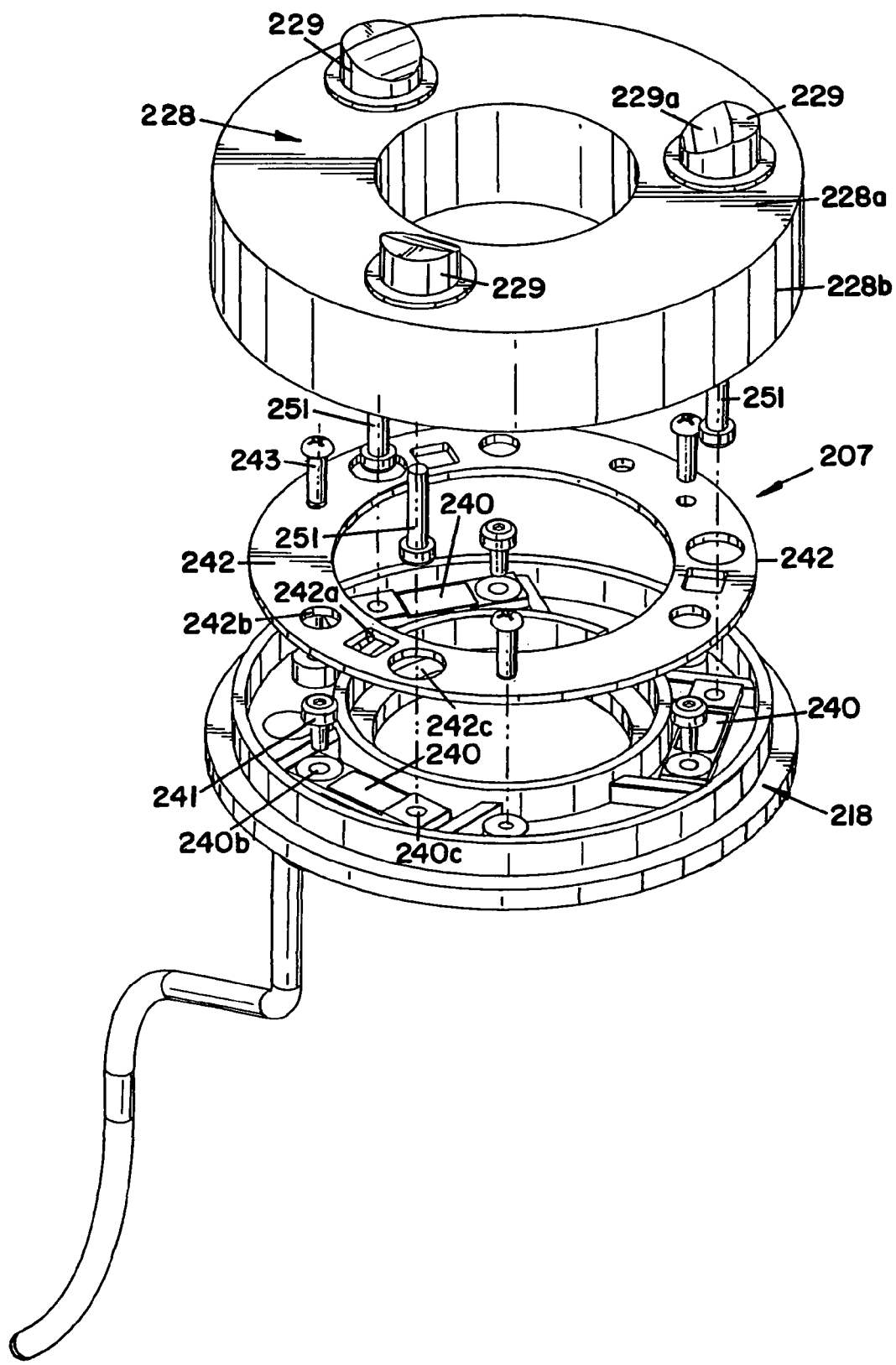
FIG. 14 is an exploded perspective view of the load cell housing shown in FIG. 11.
Figure 17:
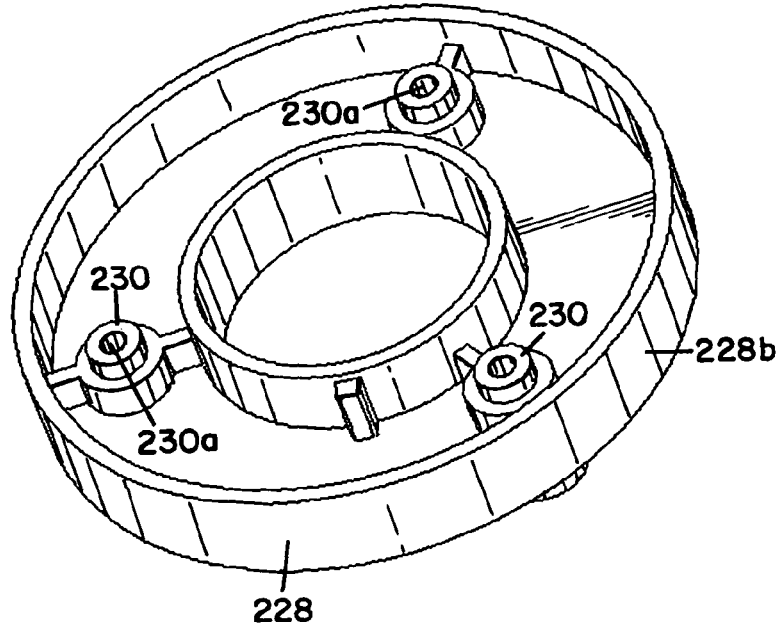
FIG. 17 is a perspective view of the top housing viewed from below.

As seen in FIG. 11, there is generally disclosed at 200a dispenser. The dispenser 200 is another embodiment in accordance with the present invention. It has been found that by using multiple load beams, there is a means to average the outlet of the load beams and develop better resolution over a single load cell. The dispenser 200 includes a housing 201 that is designed to mount on a suitable mounting surface (not shown). The support surfaces typically a wall of a room, or a surface that is sturdy enough to support the dispenser 200. However, it is understood that the dispenser 200 may be mounted in various ways, well known in the art, including the free standing dispenser. The housing 201 includes a mounting section 202 and a cylindrical section 203. The sections 202 and 203 are preferably molded as a one-piece plastic member, although it is understood that the housing 201 could also be made out of other suitable materials, such as stainless steel, and formed out of multiple pieces. The mounting section 202 has two openings 202a formed on one side and two similar openings formed on the other side (not shown in FIG. 13). The openings 202a are utilized to mount the housing 201 to the support surface. The cylindrical section 203 has a cavity 203a that is formed by the inner wall 203b. The cavity is sized to accommodate the capsule 204 which holds the concentrate. The inner wall 203b has a circular rim 203c formed around its bottom. A sump section 205 is operatively connected to the bottom of the housing 201 and provides for a collection region for the use solution. The sump has an inlet, similar to the first embodiment. The inlet is formed in the bottom of the sump section 205 proximate the center and provides for an entrance for the inlet conduit 206 that provides for fluid communication of the diluent into the cavity 203a. The sump section 205 has three indentations 205b formed in the bottom of the sump section 205. Only two of the indentations are shown in FIG. 13, the third being hidden from view. However, the three indentations 205b are spaced 120 degrees from each other and are sized and configured to receive and support the load cell housing 207, as will be described more fully hereafter. An outlet 260 provides for the flow out of the dispenser 200 of the use solution formed by the diluent and the concentrate.

A spray nozzle 208 is in fluid communication with a pipe 209 which is in turn connected to the inlet 206. The pipe 209 is preferably molded as a portion of the sump section 205.

A product holder 210 has a funnel section 211 that is sized and configured to match the outer shape of the neck of the capsule 204. The product holder 210 then has a cylindrical section 212 that has a lip or rim 212a formed therein. The rim 212a provides a surface on which the neck 204a of the capsule 204 rests when the dispenser 200 is operational. A second funnel section 213 is operatively connected to the cylindrical section 212. It is the funnel section 213 that rests on the load cell housing 207, as will be described more fully hereafter. A second cylindrical section 214 is operatively connected to the second funnel section 213 and extends down around the pipe 209.

During operation, the capsule 204 is positioned on the product holder 210, which is in turn carried by the load cell housing 207. Therefore, the weight of the capsule 204 and the product holder 210 is weighed by the load cell. However, to protect the load cell housing 207 from extreme shock by the dropping in of the capsule 204 directly on the load cell housing 207, the present invention utilizes a moveable capsule or container holder 215. The container holder 215 includes a cylindrical wall portion 215a to which a circular rim 215b is connected at the bottom. Then, a tapered section 215c extends down from the rim 215b. The cylindrical wall portion 215a is sized and configured to fit inside of the cavity 203a so that it may be moved up and down. At the top and back of the wall portion 215a is formed a cover mounting member 215d. The cover mounting member 215d terminates in a cylindrical portion 215e that is utilized to pivotally connect a cover 216. The cover 216 has a lid portion 216a that is sized and configured to cover the cavity 203a. A slot 216b is sized and configured to receive the cylindrical portion 215e of the container holder to make a snap fit between the cover 216 and the holder 215. The cover has an extension 216c on which a cam 216d is formed. The cam 216d acts on a cam surface 201a which is the top of the mounting section 202.

Figure 12:
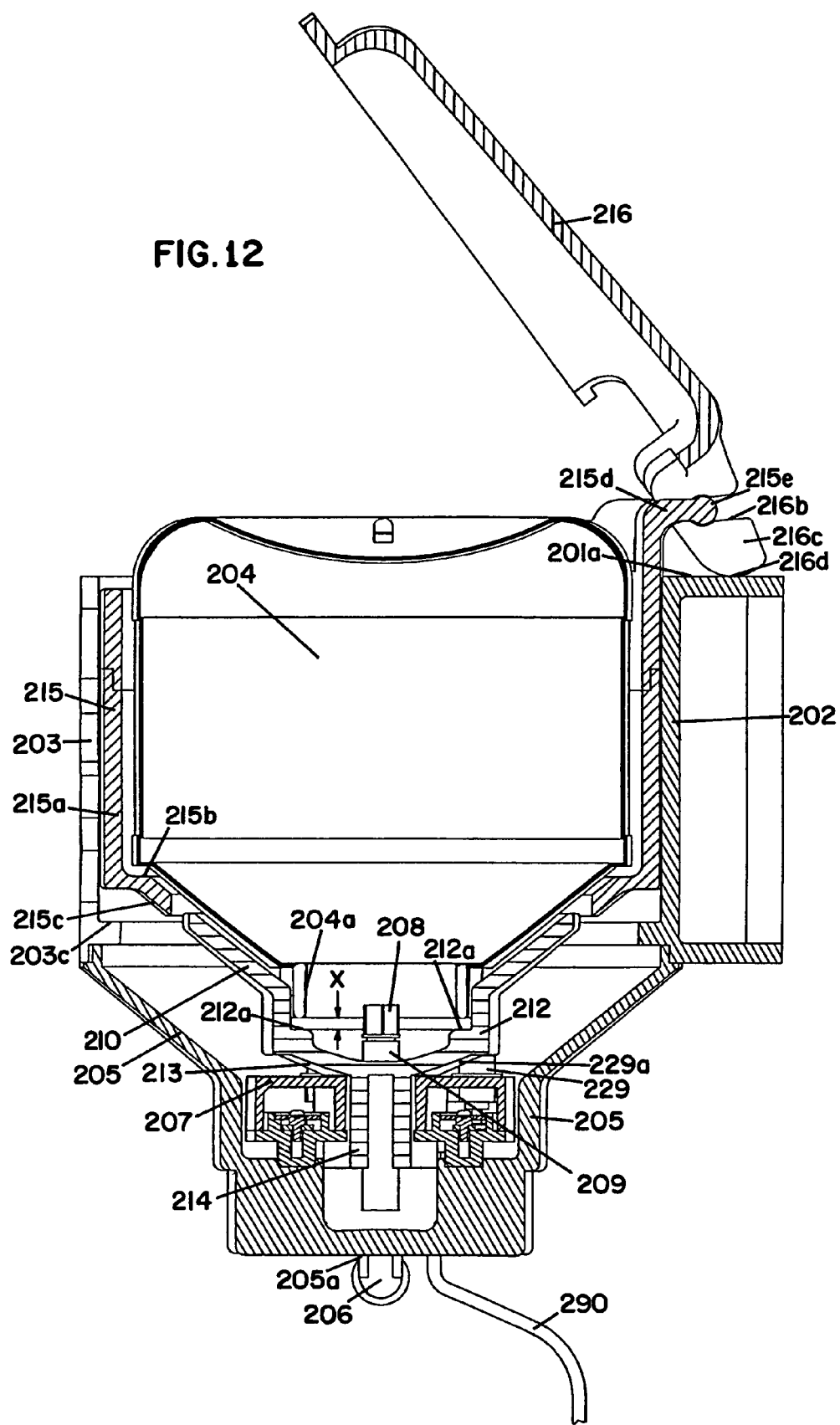
FIG. 12 is a cross-sectional view of the dispenser show in FIG. 11, taken generally along the lines 12-12.

When the cover 216 is raised, as shown in FIG. 12, the cover mounting member 215d is carried to the upper position, which necessarily raises the entire container holder 215. When the container holder 215 is raised, it raises up the capsule 204 also as the capsule 204 is resting on rim 215b. This provides a distance X as shown in FIG. 12, between the rim 212a and the neck 204a. Therefore, if a capsule was loaded by simply dropping or forcing it into the dispenser 200, the force would not be absorbed by the product holder 210, but would instead be absorbed by the container holder 215, the tapered section 215c and the rim 215b. When lowered, the cam 216d, along with a pivoting section of the cover 216 will cause the cover mounting member 215d to be lowered as the distance the slot 216b is above the cam surface 216d is less, which in turn will allow the capsule 204 to be supported on the product holder 210. This will be further described with respect to the dispenser 300. This therefore allows the concentrate inside of the capsule 204 to be weighed, as discussed with the previous embodiment. A magnetic switch has a first portion 295a and a second part 295b to indicate if the cover is closed.

Referring now, especially to FIGS. 14-17, the load cell housing 207 will be described in more detail. The present dispenser 200 utilizes more than one load cell. As shown in the embodiment for dispenser 200, three load cells are utilized, although it is also understood that two or more than three may also be used.

The housing 207 includes a base member 218 and a top member 228. Three protrusions 219 extend from the bottom 218a of the base member 218. The protrusions 219 are spaced 120 degrees from each other and are sized and configured to rest in the indentations 205b. The housing 207 is in the general shape of a ring. The base member 218 includes a circular wall 220 that defines a ledge 220a. The wall 220 and ledge 220a form a structure for receiving the top member 228. An inner wall 221 is spaced from the wall 220 and forms a ring in which the three load cells 240 are positioned. Three sets of dividing members 222, 223 define three receiving areas 224 in which the load cells 240 are positioned. The load cells or strain gauges 240 are suitably mounted on a load beam or base member 240a that is generally rectangular. The base member 240a has a first mounting opening 240b and a second opening 240c. The opening 240b is above a bore 218b. A bolt 241 secures the first end of the base member 240a to the base member 218. The second bore 218c is formed in each receiving area 224 underneath the second, free end of the load cell base member 240a. The receiving area 224 is sized and configured so that the length of the base member 240a is substantially the same. This will prevent torsion from affecting the load cell by not allowing the base member 240a to twist. The first end of the load cell that is proximate the wall 223 has a very minimal clearance such as 0.003 inches. The other end, proximate the wall 222 has a clearance of approximately 0.005 inches. The clearance is slightly more to allow for the movement up and down of the free end of the load cell 240. Also, with the first end secured to the base member, the first end is the dominate end for protection from twisting of the load cell 240. However, the receiving area 224 is sized to limit the amount of torsion that may be applied to the load cell 240 via the base member 240a. Three standoffs 225, with openings 225a, are also operatively connected to the base member 218 and spaced at 120 degree intervals. The load cells 240 are connected to the printed circuit board 242 by wires (not shown). The wires from the load cell 240 would pass through the rectangular opening 242a. Additional mounting holes 242b, 242c are also formed above each of the receiving areas 224. The printed circuit board 242 is of known construction.

The top member 228 has a generally planar top surface 228a with a cylindrical side wall 228b. The side wall 228b is sized and configured to fit around the wall 220 and on top of the ledge 220a. The top surface has three protrusions 229 that extend upward. The protrusions have a sloped surface 229a that is adapted and configured to receive the underneath of the cylindrical section 212 of the product holder 210. Three bosses 230 are formed on the underneath side of the housing 228 and have bores 230a formed therein.

As previously discussed, the base member 240a or load beam has its first end secured to the base member 218 by a bolt 241. The other end of the base member 240a is secured by bolt 251 through opening 240c to the protrusion 230, thereby securing the moveable end of the base member 240a to the top member 228. The PC board 242 is secured to the base member 218 by screw 243. An electrical cord 290 is generally shown in FIG. 12.

Figure 18:
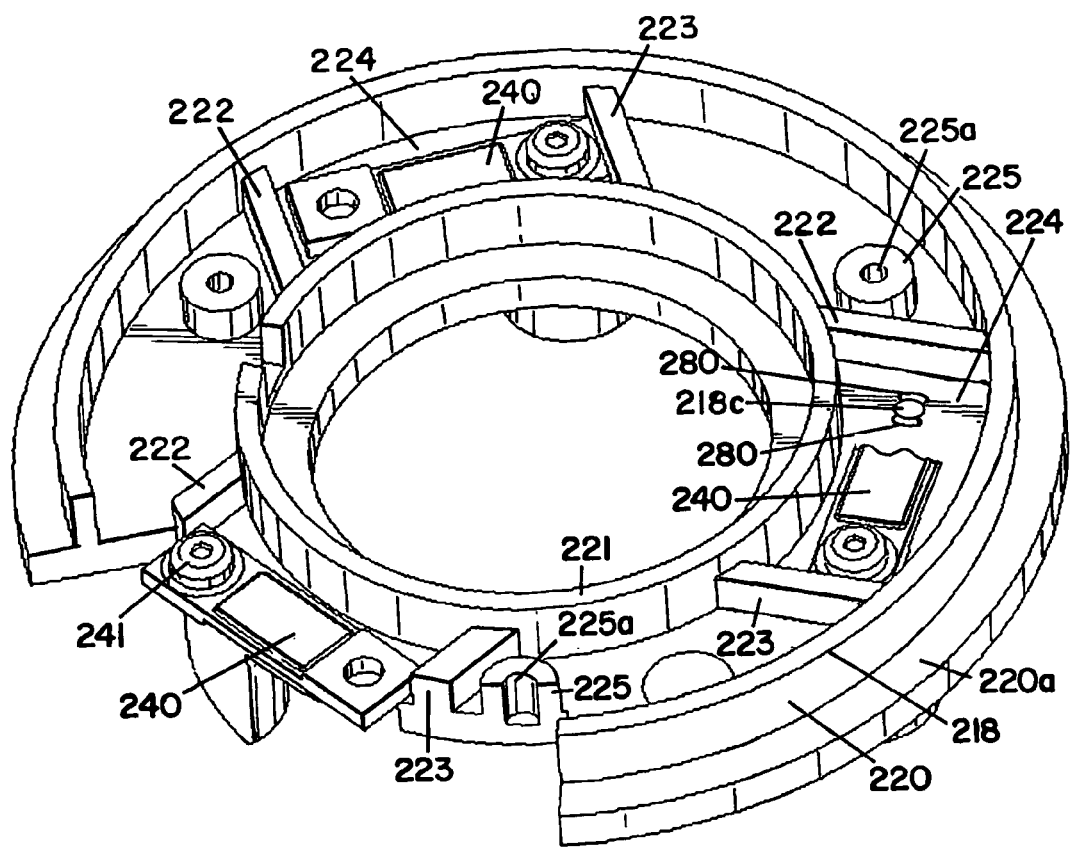
FIG. 18 is a perspective view of the bottom housing viewed generally from above.
Figure 22:
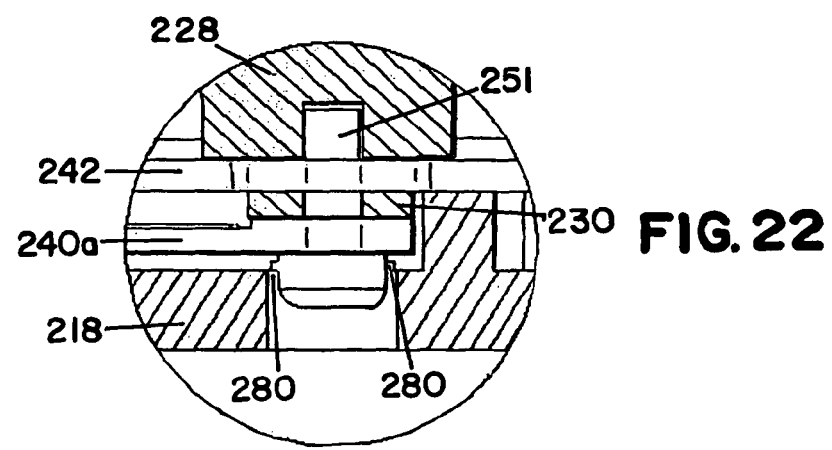
FIG. 22 is an enlargement of a portion of FIG. 16.

Referring to FIGS. 18 and 22, it can be seen that two stop members 280 are formed around the bore 218c. The stop members 280 are in the general shape of an arc. The stops 280 extend above the inner surface of the base member 218. As can be seen in FIG. 22 more easily, the stop members 280 will limit the deflection of the load beam 240a. There is typically a maximum deflection that manufacturers provide for a rated weight. Typically this is 150 percent of the rated load. The strain response is linear to weight. If the deflection is established for 100 percent of the load, by multiplying the deflection value by 1.5 yields a maximum deflection before there is potential damage to the strain gauge 240. A stop, such as stop 280 at this deflection point provides a means to prevent deflection beyond the maximum rated deflection. The stops 280 protect the strain gauge 240 from being overloaded.

By using multiple load cells, there is a means to average the output and develop better resolution over a single load cell. The load cells in both embodiments, whether single or multiple, use strain gauge technology that has linear output as weight changes. The circular load cell housing 207 houses more than one, and as shown, three load cells. The multiple load cells provide sensors for accurate weight measurement under varying load conditions that can result from detergent tablets that dissolve unevenly. Multiple load cells also minimize vibration induced single variations. Also, if one load cell would fail, it is possible to compensate using the two surviving load cells and adjustment algorithms. The load cell housing 207 may be sealed after assembly to provide environmental protection from surrounding chemistries. While not shown, the load cell may contain an electronic device that stores a digital data sheet that is programmed by the manufacturer. This data sheet will contain load cell calibration data as well as load cell service information. The resident data sheet is accessed by a controller for automatic load cell configuration. This eliminates the need for load cell signal conditioning hence reducing load cell costs. For example, the analog-front-end of the controller may use a 24-byte analog-to-digital converter for signal measurement of each sensor in the load cell. Resolution of measured produce weight is at least 20,000 counts with a sample rate of 50 samples per second. The controller sums the signal outputs of the load cell sensors providing a total weight measurement. Along with the sum sensor output, the controller also provides a discrete output from each sensor in the load cell assembly. This feature allows for accurate system calibration as well as providing data that is used to evaluate the uniformity of the solid detergent as it dissolves. When a sensor in the load cell is supporting a disproportionate amount of weight a potential problem may exist, such as, an uneven spray delivered to the solid product surface due to damage or clogged spray nozzles. The controller can provide automatic re-zeroing routine that assures accurate weight measurement each time a new solid rinse capsule or block is placed in the dispenser. An automatic tare function may also be employed so that the weight of the solid product support fixture and the empty capsule container are removed from the weight reading. The operation and use of dispenser 200, except for that previously described is similar to dispenser 10 and will not be reiterated.

Figure 23:
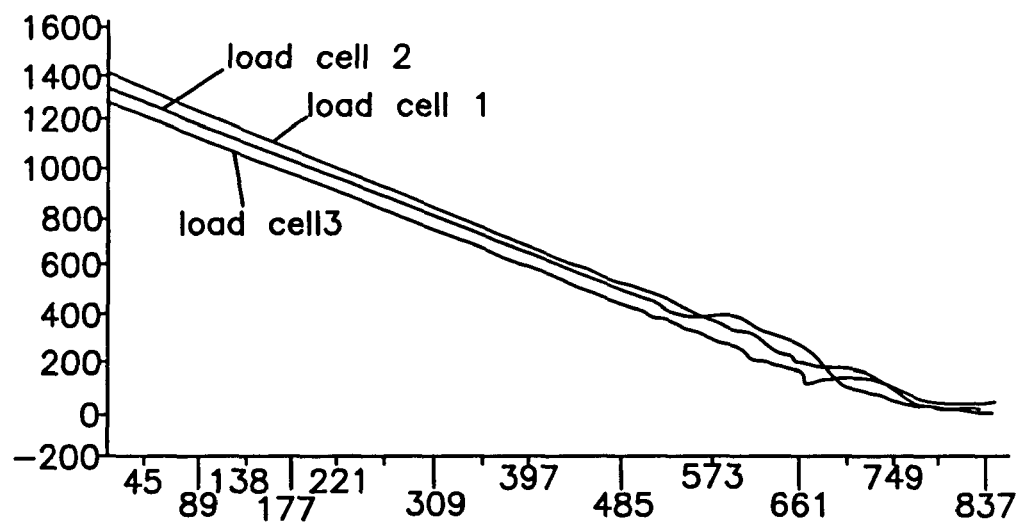
FIG. 23 is a graph of a dispenser using three load cells.
Figure 24:
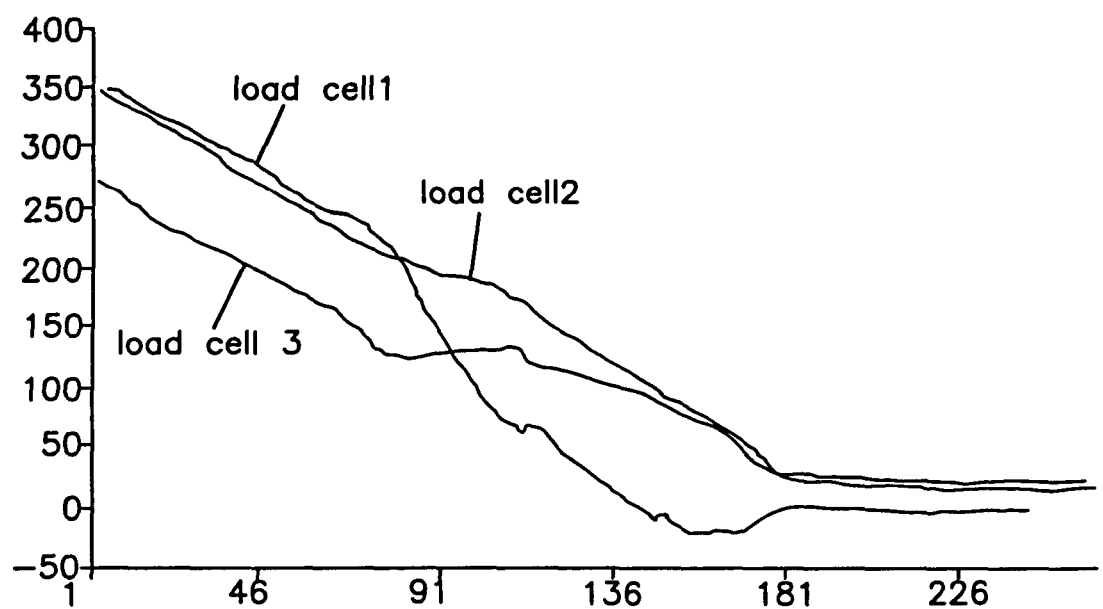
FIG. 24 is an enlargement of a portion of FIG. 23.

Referring to FIGS. 23 and 24, there is shown a graph of the weight sensed by each load cell as the number of cycles increases. As previously discussed, an appropriate controller would provide the total weight by utilizing all three inputs from the three load cells. It can be seen that in FIG. 23, throughout most of the cycles, the load cells are relatively close in the amount of weight sensed. FIG. 24 is an enlarged view of the end of the cycles shown in FIG. 23. The number of cycles have been renumbered starting with 1. The amount of discrepancy between the weight sensed by each load cell is more easily seen in FIG. 24 as the scale is enlarged. However, it can also be seen that for load cell 1, at approximately 150 cycles, the weight sensed is negative, thereby indicating that the load cell 240 is in tension. As the concentrate inside of the capsule or container 204 is dispensed, towards the end of the cycles, larger chunks will break off and there will be uneven weight distribution, as evidenced by the graph shown in FIG. 24. The multiple load cell feature of the present invention is advantageous in providing an accurate measurement of the amount of concentrate actually dispensed.

Figure 19:
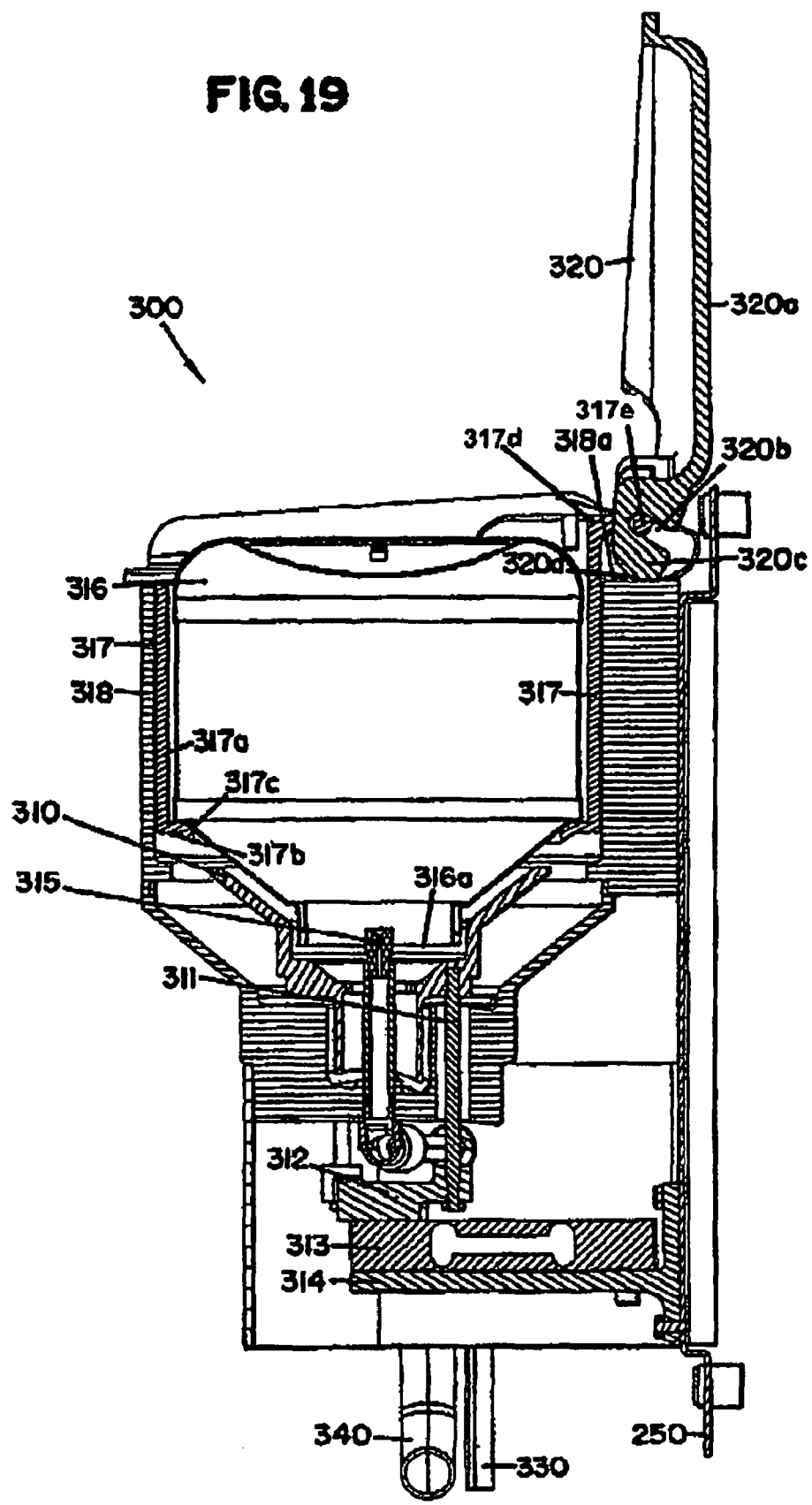
FIG. 19 is a cross-sectional view of another embodiment of a dispenser according to the present invention, with the cover in a raised position.
Figure 20:
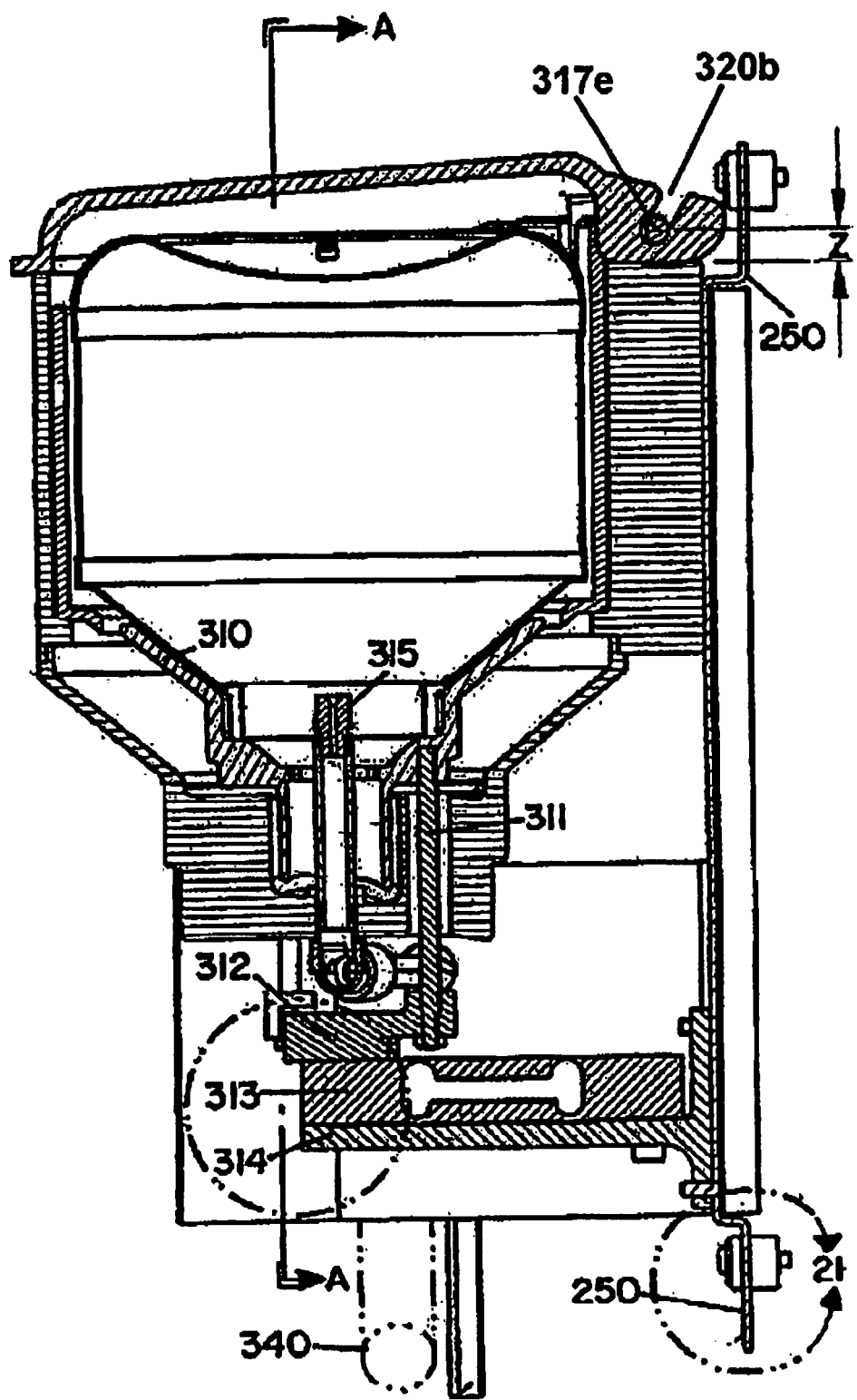
FIG. 20 is a cross-sectional view of the embodiment shown in FIG. 19, with the cover in a closed position.
Figure 21:
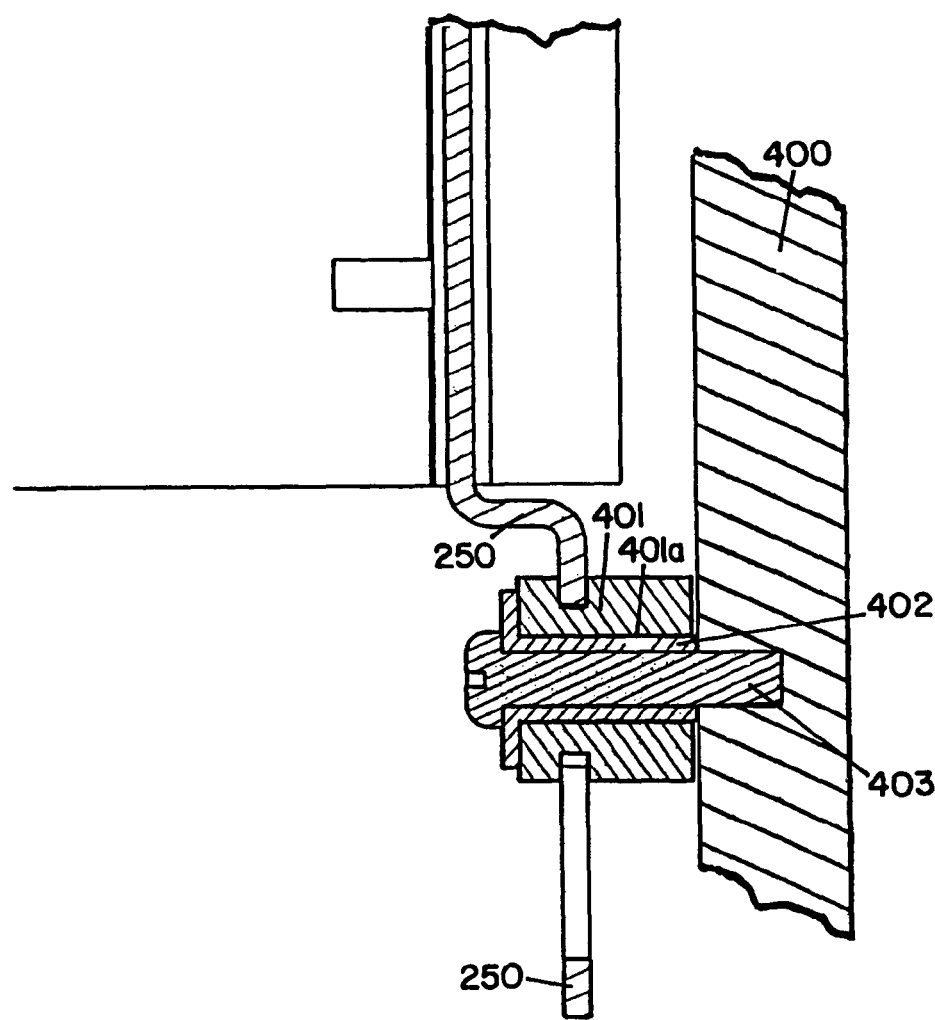
FIG. 21 is an enlarged cross-sectional view of a portion of the dispenser shown in FIG. 20.

Referring now to FIGS. 19-21, there is generally disclosed another embodiment of the present invention and shows a dispenser 300. The dispenser 300 is more similar to the first embodiment shown in FIGS. 1-10. However, the additional feature of a moveable housing to prevent shock has been added. Accordingly, this feature will be discussed in more detail to give a better understanding of how the moveable container holder operates as also shown and discussed with respect to dispenser 200.

Generally, the dispenser 300 includes a product holder 310 that is supported on a support arm 312 by arm sections 311. The support arm 312 in turn is positioned on top of the load cell 313 that is positioned on support bracket 314. Spray nozzle 315 extends into the capsule 316. An inlet hose 330 is used to supply the diluent to the nozzle 315. An outlet conduit 340 carries the use solution from the dispenser.

As can be seen in FIG. 19, the moveable container holder 317 is generally circular in shape and slidably fits within the housing 318. The moveable container holder 317 includes the cylindrical wall portion 317a operatively connected to a rim 317b, which in turn has a tapered section 317c connected thereto. When the capsule 316 is placed initially into the dispenser 300, the capsule sits on the rim 317b and is also supported by the tapered sections 317c. This spaces the neck 316a of capsule 316 away from the product holder 310. The cover 320 includes a lid 320a that has a slot 320b formed therein. The moveable container holder 317 has a cover mounting member 317d with a cylindrical portion 317e that is snap fitted into the slot 320b. The cover 320 has an extension 320c with a cam 320d at one end. The cam operates on a cam surface 318a of housing 318.

FIG. 20 shows the cover in a down position after the cover has been pivoted. As can be seen, the distance Z is less in FIG. 20 than in FIG. 19. In comparing FIG. 19 and FIG. 20, it can be seen that the cam action raises and lowers member 317d and therefore the moveable container 17, which supports the capsule, until when in the closed position, the capsule 316 is supported on product holder 310 which is carried by the load cell. Since the cylindrical wall portion 317a is rigid, the rim 317b necessarily is lowered by the same amount. As can be seen in FIG. 20, the rim 317b is now below the capsule 316 and the entire weight of the capsule is carried by the product holder 310. As shown in FIG. 19, the product holder 310 is isolated from any jarring that would occur by the capsule 316 being dropped into the dispenser 300.

Referring now to FIG. 21, there is shown in greater detail a method of mounting the dispenser 300 to a mounting surface 400. Since vibrations are a consideration, the mounting mechanism shown in FIG. 21 helps reduce the vibration and thereby allows the load cells to more accurately weigh the capsule and its contents. The mounting panel 250 that is used to mount the dispenser 300 to the mounting surface 400 has an opening into which an elastomer member 401 is inserted. The elastomer member may be made from any suitable material with a suitable durometer such as from 55-65. The member 401 may also take any suitable size or shape such as a cylindrical member as shown. A cylindrical hard plastic insert 402 is positioned inside of the bore 401a of the member 401. Then, a screw 403 is inserted through a bore in the plastic insert 402 and secured into the mounting surface 400. The plastic insert has sufficient structural strength to withstand the compressive force to secure the dispenser 300 to the mounting surface. The elastomer member then allows the dispenser to "float" or isolate the dispenser from vibrations, thereby minimizing vibrations. A similar elastomer member, insert and screw may also be utilized with respect to the other embodiments shown. As dispenser 300 is a single load cell, the use and operation will be quite similar to dispenser 10, except for that discussed above, and therefore will not be reiterated.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A dispenser comprising:
   a housing that receives a product capsule containing a product concentrate to be dispensed and that includes a bottom surface having an opening through which a neck of the product capsule extends;
   an inlet through which diluent enters the housing and erodes the concentrate to create a use solution;
   an outlet through which the use solution exits the housing;
   a product holder that receives the neck of the product capsule such that the product holder fully supports the weight of the product capsule;
   a load cell housing that supports the product holder;
   a plurality of load cells positioned within the load cell housing that detect a corresponding plurality of weight values corresponding to the weight of the product capsule; and
   a controller that determines the weight of the concentrate within the product capsule based on the plurality of weight values.

2. The dispenser of claim 1 wherein the plurality of load cells comprises two load cells.

3. The dispenser of claim 2 wherein the load cell housing is generally circular and the load cells are spaced approximately 180 degrees from each other.

4. The dispenser of claim 1 wherein the plurality of load cells comprises three load cells.

5. The dispenser of claim 4 wherein the load cell housing is generally circular and the load cells are spaced approximately 120 degrees from each other.

6. The dispenser of claim 1 wherein the controller averages the plurality of weight values to determine the weight of the concentrate.

7. The dispenser of claim 1 wherein the controller determines the weight of the concentrate before a dispensing cycle.

8. The dispenser of claim 1 wherein the controller determines the weight of the concentrate during a dispensing cycle.

9. The dispenser of claim 1 wherein the controller determines the weight of the concentrate after completion of a dispensing cycle.

10. The dispenser of claim 1 wherein the controller initiates a dispensing cycle, periodically determines the weight of the concentrate during the dispensing cycle and discontinues the dispensing cycle when the determined weight of the concentrate satisfies a requested amount.

* * * * *